(12) United States Patent
McIntosh et al.

(10) Patent No.: US 12,386,503 B2
(45) Date of Patent: *Aug. 12, 2025

(54) METHODS AND SYSTEMS FOR POSITIONING ANIMATED IMAGES WITHIN A DYNAMIC KEYBOARD INTERFACE

(71) Applicant: Google LLC, Mountain View, CA (US)

(72) Inventors: David McIntosh, San Francisco, CA (US); Peter Chi Hao Huang, Pacifica, CA (US); Erick Hachenburg, San Francisco, CA (US); David Lindsay Bowen, San Francisco, CA (US); Joseph Lieu, San Francisco, CA (US); Kira Lee Psomas, Berkeley, CA (US); Jason R. Krebs, New York, NY (US); Kumar Garapaty, San Francisco, CA (US); Samantha Janelle Jiwei Lau, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,890

(22) Filed: Jul. 13, 2023

(65) Prior Publication Data
US 2023/0359353 A1   Nov. 9, 2023

Related U.S. Application Data

(63) Continuation of application No. 17/272,541, filed as application No. PCT/US2019/047216 on Aug. 20, 2019, now Pat. No. 11,740,787.
(Continued)

(51) Int. Cl.
*G06F 3/048* (2013.01)
*G06F 3/04817* (2022.01)
(Continued)

(52) U.S. Cl.
CPC ...... *G06F 3/04886* (2013.01); *G06F 3/04817* (2013.01); *G06T 13/40* (2013.01); *G06T 13/80* (2013.01)

(58) Field of Classification Search
None
See application file for complete search history.

(56) References Cited

U.S. PATENT DOCUMENTS

| 10,325,416 B1 * | 6/2019 | Scapel | G06T 3/40 |
| 2003/0119531 A1 * | 6/2003 | Patton | H04W 64/00 455/445 |

(Continued)

FOREIGN PATENT DOCUMENTS

| JP | 2002/207749 | 7/2002 |
| JP | 2014/534540 | 12/2014 |

(Continued)

OTHER PUBLICATIONS

Chinese Search Report Corresponding to Application No. 2019800571901 on Jan. 11, 2024.
(Continued)

*Primary Examiner* — Hua Lu
(74) *Attorney, Agent, or Firm* — DORITY & MANNING, P.A.

(57) ABSTRACT

The present disclosure is directed to positioning animated images within a dynamic keyboard interface. In particular, the methods and systems of the present disclosure can: receive data indicating a selection of a particular animated image from amongst a plurality of different animated images presented by a dynamic keyboard interface provided in association with an application; receive data indicating a context of: the dynamic keyboard interface, and/or the application based at least in part on which the plurality of different animated images was selected for presentation by the dynamic keyboard interface; and determine, based at (Continued)

least in part on the data indicating the selection and the data indicating the context, a position within the dynamic keyboard interface for presenting the particular animated image in response to data indicating a subsequent context of the dynamic keyboard interface, the application, and/or a different and distinct application.

20 Claims, 32 Drawing Sheets

Related U.S. Application Data

(60) Provisional application No. 62/725,641, filed on Aug. 31, 2018.

(51) Int. Cl.
  *G06F 3/04886* (2022.01)
  *G06T 13/40* (2011.01)
  *G06T 13/80* (2011.01)

(56) References Cited

U.S. PATENT DOCUMENTS

| | | | |
|---|---|---|---|
| 2010/0241663 A1 | 9/2010 | Huang et al. | |
| 2010/0265182 A1* | 10/2010 | Ball | G06F 3/038 715/765 |
| 2011/0153387 A1* | 6/2011 | Ma | G06Q 10/10 705/347 |
| 2011/0179359 A1* | 7/2011 | Nussel | G06F 3/0484 715/738 |
| 2014/0157153 A1* | 6/2014 | Yuen | A63F 13/537 715/758 |
| 2014/0223372 A1* | 8/2014 | Dostie | G06F 3/0482 715/813 |
| 2015/0100537 A1* | 4/2015 | Grieves | G06N 5/02 706/52 |
| 2015/0212689 A1* | 7/2015 | Gomez-Rosado | G06Q 30/0631 715/765 |
| 2016/0027045 A1* | 1/2016 | Kurian | G06F 16/24575 705/14.49 |
| 2016/0210116 A1* | 7/2016 | Kim | G06F 40/274 |
| 2016/0210279 A1* | 7/2016 | Kim | G06F 40/30 |
| 2016/0306438 A1* | 10/2016 | Kehoe | G06F 1/1643 |
| 2017/0068448 A1* | 3/2017 | Ghassabian | G06F 21/316 |
| 2017/0083524 A1* | 3/2017 | Huang | G06F 16/9538 |
| 2017/0083624 A1 | 3/2017 | Scapa et al. | |
| 2017/0142044 A1* | 5/2017 | Ball | G06Q 30/02 |
| 2017/0148072 A1* | 5/2017 | Goodwin | G06Q 30/0643 |
| 2017/0300462 A1* | 10/2017 | Cudworth | G06F 40/274 |
| 2017/0336926 A1* | 11/2017 | Chaudhri | G06F 3/0412 |
| 2017/0344224 A1* | 11/2017 | Kay | G06F 3/0482 |
| 2017/0344244 A1 | 11/2017 | Sakaguchi et al. | |
| 2017/0371522 A1* | 12/2017 | Martinez del Corral | G06F 3/04883 |
| 2018/0025219 A1* | 1/2018 | Baldwin | H04L 51/04 382/118 |
| 2018/0039406 A1 | 2/2018 | Kong et al. | |
| 2018/0047195 A1 | 2/2018 | Vissicaro et al. | |
| 2018/0053101 A1 | 2/2018 | Cudworth et al. | |
| 2018/0083898 A1* | 3/2018 | Pham | H04L 51/046 |
| 2018/0091732 A1* | 3/2018 | Wilson | H04N 23/611 |
| 2018/0137660 A1* | 5/2018 | De Abreu Rodriguez | G06F 16/532 |
| 2018/0173417 A1* | 6/2018 | Foresti | G06F 3/013 |
| 2018/0173692 A1 | 6/2018 | Greenberg et al. | |
| 2018/0300542 A1* | 10/2018 | Waddell | G06V 30/387 |
| 2018/0329622 A1* | 11/2018 | Missig | G06F 3/04886 |
| 2021/0326037 A1 | 10/2021 | McIntosh et al. | |

FOREIGN PATENT DOCUMENTS

| | | |
|---|---|---|
| JP | 2015/507791 | 3/2015 |
| JP | 2018/109991 | 7/2018 |
| JP | 2018/523178 | 8/2018 |
| JP | 2022/016040 | 1/2022 |
| KR | 2016/0022851 | 3/2016 |
| KR | 2016/0039523 | 4/2016 |
| KR | 2016/0065174 | 6/2016 |
| WO | WO 2020/046637 | 3/2020 |

OTHER PUBLICATIONS

Machine Translated Japanese Search Report Corresponding to Application No. 201780072919 on Apr. 19, 2022.
International Preliminary Report on Patentability for PCT/US2019/047216, mailed on Mar. 2, 2021, 12 pages.
International Search Report for PCT/US2019/047216, mailed on Nov. 29, 2019, 2 pages.

* cited by examiner

METHODS AND SYSTEMS FOR POSITIONING ANIMATED IMAGES WITHIN A DYNAMIC KEYBOARD INTERFACE

RELATED APPLICATIONS

This application is a continuation of U.S. Non-Provisional Patent Application No. 17/272,541 filed on Mar. 1, 2021, which claims priority under 35 U.S.C. § 371 to and the benefit of International Patent Application No. PCT/US2019/047216 filed on Aug. 20, 2019, which claims priority to and the benefit of U.S. Provisional Patent Application No. 62/725,641 filed on Aug. 31, 2018. U.S. Provisional Patent Application No. 62/725,641, International Patent Application No. PCT/US2019/047216, and U.S. Non-Provisional patent application Ser. No. 17/272,541 are hereby incorporated by reference in its entirety.

This application claims priority to and the benefit of U.S. Provisional Patent Application No. 62/725,641 filed on Aug. 31, 2018. U.S. Provisional Patent Application No. 62/725,641 is hereby incorporated by reference in its entirety.

FIELD

The present disclosure relates generally to animated images. More particularly, the present disclosure relates to positioning animated images within a dynamic keyboard interface.

BACKGROUND

Computing devices (e.g., desktop computers, laptop computers, tablet computers, smartphones, wearable computing devices, and/or the like) are ubiquitous in modern society. They can support communications between their users, provide their users with information about their environments, current events, the world at large, and/or the like. A myriad of different types of interfaces enable users to interact with such devices. For example, many devices include a touchscreen and provide an interface (e.g., including user-selectable options, a keyboard, and/or the like) configured to enable users to input information. Animated images (e.g., graphics interchange format (GIF) images, and/or the like) can include data indicating a series of ordered image frames that when rendered produce a moving image, and/or the like. Animated images can be utilized to express, convey, communicate, and/or the like thoughts, feelings, concepts, emotions, and/or the like.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by one or more computing devices, data indicating a selection of a particular animated image from amongst a plurality of different animated images presented by a dynamic keyboard interface provided in association with an application. The method can also include receiving, by the computing device(s), data indicating a context of: the dynamic keyboard interface based at least in part on which the plurality of different animated images was selected for presentation by the dynamic keyboard interface, and/or the application based at least in part on which the plurality of different animated images was selected for presentation by the dynamic keyboard interface. The method can further include determining, by the computing device(s) and based at least in part on the data indicating the selection and the data indicating the context, a position within the dynamic keyboard interface for presenting the particular animated image in response to data indicating a subsequent context of the dynamic keyboard interface, the application, and/or a different and distinct application in association with which the dynamic keyboard interface is provided.

Another example aspect of the present disclosure is directed to a system. The system can include one or more processors and a memory storing instructions that when executed by the processor(s) cause the system to perform operations. The operations can include receiving data indicating a context of: a dynamic keyboard interface when a particular animated image was selected from amongst a plurality of different animated images presented by the dynamic keyboard interface in association with an application with which the dynamic keyboard interface is provided, and/or the application with which the dynamic keyboard interface is provided when the particular animated image was selected from amongst the plurality of different animated images presented by the dynamic keyboard interface. The operations can also include determining, based at least in part on the data indicating the context, a position within the dynamic keyboard interface for presenting the particular animated image in response to data indicating a subsequent context of the dynamic keyboard interface, the application, and/or a different and distinct application in association with which the dynamic keyboard interface is provided.

A further example aspect of the present disclosure is directed to one or more non-transitory computer-readable media. The non-transitory computer-readable media can comprise instructions that when executed by one or more computing devices cause the computing device(s) to perform operations. The operations can include receiving data indicating a selection of a particular animated image from amongst a plurality of different animated images presented by a dynamic keyboard interface provided in association with an application. The operations can also include receiving data indicating an amount of time between the selection of the particular animated image and: a time when the plurality of different animated images was presented by the dynamic keyboard interface, and/or a time when the particular animated image was initially made available for selection from amongst the plurality of different animated images by the dynamic keyboard interface. The operations can further include determining, based at least in part on the data indicating the selection and the data indicating the amount of time, a position within the dynamic keyboard interface for presenting the particular animated image in response to data indicating a context of: the dynamic keyboard interface, the application, and/or a different and distinct application in association with which the dynamic keyboard interface is provided.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
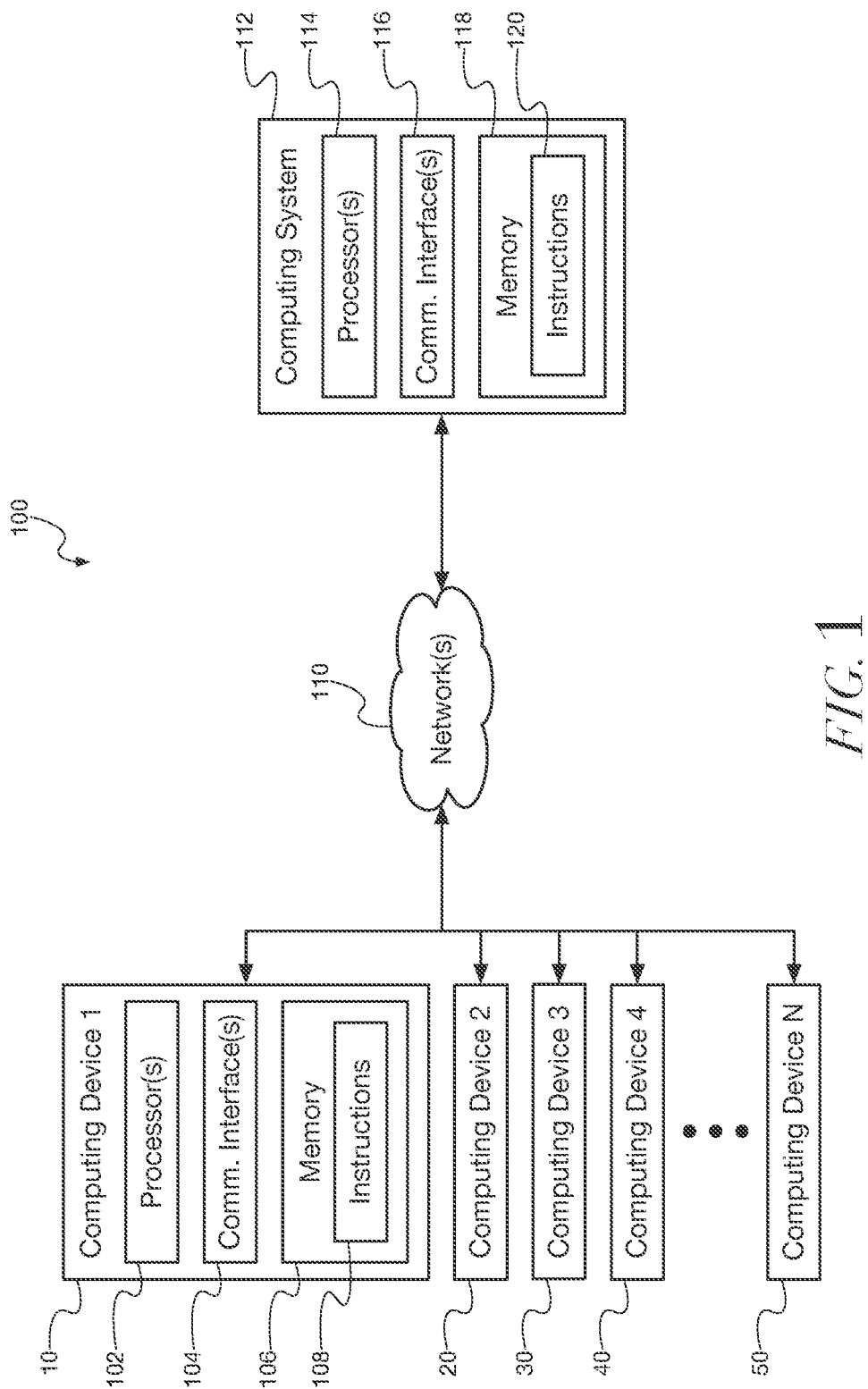
FIG. 1 depicts an example computing environment according to example embodiments of the present disclosure.

Example aspects of the present disclosure are directed to positioning animated images within a dynamic keyboard interface. In particular, animated images can be identified based at least in part on a context of the dynamic keyboard interface (e.g., one or more search terms input via the dynamic keyboard interface, data presented by and/or input into one or more applications in association with which the dynamic keyboard interface is provided, and/or the like); positioned based at least in part on the context, their selection frequencies, and/or the like; and presented (e.g., for browsing, selection, and/or the like) by the dynamic keyboard interface in association with an application.

Animated images can be presented to the user in the dynamic keyboard interface based on prior interactions with the animated images and/or other context information. As one example, generally popular animated images (e.g., among many users) can be place more prominently within the dynamic keyboard interface for the user. As another example, animated images that the user has previously selected can be displayed and/or emphasized within the dynamic keyboard interface. Additionally, animated images that are similar with such previously selected animated images can be displayed and/or emphasized within the dynamic keyboard interface.

As another example, some animated images can be more frequently shared with multiple recipients (e.g., in a "group chat") than shared with a single recipient (e.g., in a one-on-one conversation). Animated images that are more frequently shared with multiple recipients can be displayed or emphasized (e.g., more prominently displayed than other animated images) within the dynamic keyboard interface when the user is searching for an animated image to send to multiple recipients. Similarly, animated images that are more frequently shared with single recipients can be displayed or emphasized (e.g., more prominently displayed than other animated images) within the dynamic keyboard interface when the user is searching for an animated image to send to a single recipient.

As a further example, animated images that are contextually relevant based on a user's prior interactions with the user device can be more prominently presented to the user. The user can select an animated image to send to a first contact. For instance, during a message exchange with a friend, the user can suggest going to the beach for an upcoming weekend. Later, when the user is searching for an animated image to send to a second contact, the computing system can select animated images based on contextual information gleaned from the user's interaction with the first contact. For instance, in response to a message from the user's boss asking if the user can work during the upcoming weekend, the computing system can display or emphasize animated images related to the beach within the dynamic keyboard interface.

As yet another example, an animated image can be displayed or emphasized based on sequential sharing information indicating the user's previous interactions and/or other user's previous interactions. For example, particular gifs can often be shared immediately following other particular animate images or in response to other particular animate image. The computing system can track and record such correlations and suggest animated images based on such contextual information. For instance, a user can share an animated image (e.g., an animated image depicting a person saying "call me" and gesturing with a phone). Statistically, this particular user and/or other users may often reply with particular animated images (e.g., an animated image including text or images conveying "thumbs up," "what's up?" or the like) in response to the particular animated image. Such animated images can be displayed or emphasized based on contextual information including such correlations.

As a further example, animated images can be displayed and/or emphasized based on contextual information that includes a "time-to-share" metric. The "time-to-share" metric can indicate a duration of time between (1) when the user began searching for an animated image (e.g., entered a search criteria and/or began scrolling through animated images within the dynamic keyboard interface) and (2) when the user selects one of the animated images to share or otherwise manipulate and/or engage. As a result, the computing system and/or dynamic keyboard interface can select animated images for display and/or emphasis to the user in a manner that shortens search time for the user.

Additionally, in some implementations, the animated images can be displayed and/or emphasized based on context data can collected across multiple computer applications (e.g., a texting application, e-mail application, etc.). The dynamic keyboard interface can be configured to interface with the multiple applications. Context data can be acquired when the dynamic keyboard is interfacing with one computer application (e.g., a texting application). Such context data can be used to select which animated images to display and/or emphasize when the dynamic keyboard interface is later used with another distinct computer application (e.g., an e-mail application).

The dynamic keyboard interface (e.g., for use via a touchscreen, and/or the like) can be provided (e.g., as part of an operating system (OS), third-party application, plugin, and/or the like) to one or more user devices (e.g., computers, smartphones, tablet computing devices, wearable computing devices, and/or the like). One or more aspects of the dynamic keyboard interface can be configured to provide access (e.g., via search functionality, suggestion functionality, browsing functionality, and/or the like) to a corpus of animated images (e.g., graphics interchange format (GIF) images, and/or the like), for example, uploaded to, stored by, indexed by, managed by, and/or the like a remotely located computing system (e.g., one or more computing devices, and/or the like).

A user (e.g., utilizing a user device providing the dynamic keyboard interface, and/or the like) can perform one or more actions that provide a context, for example, of the user device, the dynamic keyboard interface, an application (e.g., a messaging application, and/or the like) in association with which the dynamic keyboard interface is provided, and/or the like. For example, the user can locate the user device at a particular geographic location, input one or more search terms via the dynamic keyboard interface, interact with the application via its interface, and/or the like. Data indicating the context can be generated (e.g., by the user device, the dynamic keyboard interface, and/or the like), communicated to the computing system (e.g., via one or more networks, and/or the like), and received by the computing system, which can update one or more records regarding the corpus of animated images based at least in part on such data.

Based at least in part on the data indicating the context, the record(s) regarding the corpus of animated images, and/or the like, the computing system can identify a plurality of different animated images associated with the context for presentation by the dynamic keyboard interface in association with the application (e.g., animated images relevant, responsive, and/or the like to the context). In some embodiments, one or more of the plurality of different animated images associated with the context can include one or more advertisements (e.g., for one or more products, services, media content items, and/or the like).

In accordance with aspects of the disclosure, for each of one or more animated images included in the plurality of different animated images associated with the context, the computing system can determine (e.g., based at least in part on the data indicating the context, the record(s) regarding the corpus of animated images, and/or the like) a position within the dynamic keyboard interface for presenting the animated image. Data indicating the plurality of different animated images associated with the context, their respective determined positions, and/or the like can be generated (e.g., by the computing system, and/or the like) and communicated (e.g., via the network(s), and/or the like) to the dynamic keyboard interface (e.g., the user device, and/or the like), which can present the plurality of different animated images associated with the context in association with the application based at least in part on their respective determined positions. For example, the plurality of different animated images associated with the context can be presented in an ordered, sorted, and/or the like fashion (e.g., animated images determined to be more relevant, responsive, and/or the like to the context can be presented earlier, more prominently, and/or the like).

A user can select one or more particular animated images from amongst the plurality of different animated images associated with the context via the dynamic keyboard interface. For example, the user can select one or more of the particular animated image(s) for communication (e.g., input, pasting, and/or the like) by the dynamic keyboard interface to the application. Additionally or alternatively, the user can select one or more of the particular animated image(s) for future accessibility within the dynamic keyboard interface (e.g., designate such particular animated image(s) for frequent use, "favorite" them, and/or the like).

Data indicating the selection, selection type (e.g., for communication to the application, for future accessibility, and/or the like), particular animated image(s) selected, and/or the like can be generated (e.g., by the user device, the dynamic keyboard interface, and/or the like), communicated to the computing system (e.g., via the network(s), and/or the like), and received by the computing system, which can update the record(s) regarding the corpus of animated images based at least in part on such data.

A user (e.g., utilizing the user device providing the dynamic keyboard interface, a different and distinct user device providing the dynamic keyboard interface, and/or the like) can perform one or more actions that provide a subsequent context, for example, of such user device, the dynamic keyboard interface, the application (e.g., the messaging application, and/or the like) in association with which the dynamic keyboard interface is provided, a different and distinct application (e.g., an email application, and/or the like) in association with which the dynamic keyboard interface is provided, and/or the like. For example, the user can locate such user device at a particular geographic location, input one or more search terms via the dynamic keyboard interface, interact with such application(s) via their respective interface(s), and/or the like. Data indicating the subsequent context can be generated (e.g., by the user device, the different and distinct user device, the dynamic keyboard interface, and/or the like), communicated to the computing system (e.g., via the network(s), and/or the like), and received by the computing system, which can update the record(s) regarding the corpus of animated images based at least in part on such data.

Based at least in part on the data indicating the previous context; the data indicating the subsequent context; the data indicating the selection, selection type, particular animated image(s) selected, and/or the like; the record(s) regarding the corpus of animated images; and/or the like, the computing system can identify a plurality of different animated images associated with the subsequent context for presentation by the dynamic keyboard interface in association with the application and/or the different and distinct application (e.g., animated images relevant, responsive, and/or the like to the subsequent context). In some embodiments, one or more of the plurality of different animated images associated with the subsequent context can include one or more advertisements.

In accordance with aspects of the disclosure, for each of one or more animated images included in the plurality of different animated images associated with the subsequent context, the computing system can determine (e.g., based at least in part on the data indicating the previous context; the data indicating the subsequent context; the data indicating the selection, selection type, particular animated image(s) selected, and/or the like; the record(s) regarding the corpus of animated images; and/or the like) a position within the dynamic keyboard interface for presenting the animated image.

Data indicating the plurality of different animated images associated with the subsequent context, their respective determined positions, and/or the like can be generated (e.g., by the computing system, and/or the like) and communicated (e.g., via the network(s), and/or the like) to the dynamic keyboard interface (e.g., the user device, the different and distinct user device, and/or the like), which can present the plurality of different animated images associated with the subsequent context in association with the application and/or the different and distinct application based at least in part on their respective determined positions. For example, the plurality of different animated images associated with the subsequent context can be presented in an ordered, sorted, and/or the like fashion (e.g., animated images determined to be more relevant, responsive, and/or the like to the subsequent context can be presented earlier, more prominently, and/or the like).

In some embodiments, the animated image(s) included in the plurality of different animated images associated with the subsequent context can include one or more of the particular animated image(s) that were previously selected. In some of such embodiments, the position within the dynamic keyboard interface for presenting such particular animated image(s) can be determined based at least in part on their having been previously selected, the context associated with their selection, and/or the like. For example, such particular animated image(s) can be presented earlier, more prominently, and/or the like than they otherwise would have been (e.g., absent their previous selection, and/or the like). In some embodiments, one or more of such particular animated image(s) can include one or more advertisements.

In some embodiments, the data indicating the previous context can indicate one or more search terms input via the dynamic keyboard interface. In some of such embodiments, the data indicating the subsequent context can indicate at least one of such search term(s) input via the dynamic keyboard interface.

In some embodiments, the data indicating the previous context can indicate data presented by and/or input into the application associated with the previous context, and the data indicating the subsequent context can indicate data one or more of presented by or input into such application, the different and distinct application, the dynamic keyboard interface, and/or the like. In some of such embodiments, for at least one animated image of the animated image(s) included in the plurality of different animated images associated with the subsequent context, determining the position within the dynamic keyboard interface for presenting such animated image can include determining the data presented by and/or input into the application associated with the previous context corresponds at least in part to the data one or more of presented by or input into such application, the different and distinct application, the dynamic keyboard interface, and/or the like.

In some embodiments, the data indicating the previous context can indicate an animated image previously selected via the dynamic keyboard interface, a time when the animated image previously selected via the dynamic keyboard interface was selected, and/or the like. In some of such embodiments, the data indicating the subsequent context can include data indicating selection of the animated image previously selected via the dynamic keyboard interface, a time associated with the selection of the animated image via the dynamic keyboard interface, and/or the like.

In some embodiments, the data indicating the previous context can indicate a human-language setting associated with a user device on which the application associated with the previous context is executed; a geographic area to which such user device is registered; a network identifier associated with such user device; a geographic location of such user device associated with the selection of the particular animated image(s); a time associated with the selection of the particular animated image(s); a time of day associated with the selection of the particular animated image(s); a date associated with the selection of the particular animated image(s); a day of week associated with the selection of the particular animated image(s); a month associated with the selection of the particular animated image(s); a year associated with the selection of the particular animated image(s); a size of an audience associated with the selection of the particular animated image(s); an entity that provided one or more of the particular animated image(s) and/or content included in one or more of the particular animated image(s); and/or the like. In some of such embodiments, the data indicating the subsequent context can include data corresponding at least in part to the human-language setting, the geographic area, the network identifier, the geographic location, the time, the time of day, the date, the day of week, the month, the year, the size of the audience, the entity, and/or the like.

In some embodiments, the computing system can receive (e.g., from the user device on which the application associated with the previous context is executed, via the network(s), and/or the like) data indicating an amount of time between the selection of the particular animated image(s) and a time when the plurality of different animated images associated with the previous context was presented by the dynamic keyboard interface, a time when the particular animated image(s) selected were initially made available for selection from amongst the plurality of different animated images associated with the previous context by the dynamic keyboard interface, and/or the like. In some of such embodiments, for at least one animated image of the animated image(s) included in the plurality of different animated images associated with the subsequent context, determining the position within the dynamic keyboard interface for presenting such animated image can include determining such position based at least in part on the data indicating the amount of time.

In some embodiments, determining such position based at least in part on the data indicating the amount of time can include normalizing the data indicating the amount of time based at least in part on a position of such animated image within the dynamic keyboard interface when the plurality of different animated images associated with the previous context was presented by the dynamic keyboard interface, a position of such animated image within the dynamic keyboard interface when such animated image was initially made available for selection from amongst the plurality of different animated images associated with the previous context by the dynamic keyboard interface, and/or the like.

In some embodiments, for at least one animated image of the animated image(s) included in the plurality of different animated images associated with the subsequent context, determining the position within the dynamic keyboard interface for presenting such animated image can include determining, based at least in part on the data indicating the selection of such animated image, a selection frequency for such animated image. In some of such embodiments, the position for such animated image can be determined based at least in part on the selection frequency for such animated image, one or more selection frequencies for such position, and/or the like.

The technology indicated herein can provide a number of technical effects and benefits. For example, as previously indicated, the technology indicated herein can present animated images determined to be more relevant, responsive, and/or the like to a given context earlier, more prominently, and/or the like, thereby reducing time spent browsing for, locating, and/or the like such animated images, thus conserving computing resources (e.g., energy, processing cycles, network bandwidth, and/or the like).

With reference now to the Figures, example embodiments of the present disclosure will be discussed in further detail.

FIG. 1 depicts an example computing environment according to example embodiments of the present disclosure.

Referring to FIG. 1, environment 100 can include one or more computing devices (e.g., one or more desktop computers, laptop computers, tablet computers, mobile devices, smartphones, wearable devices, servers, and/or the like). For example, environment 100 can include computing devices 10, 20, 30, 40, and 50 and computing system 112, which can include one or more computing devices. Environment 100 can also include one or more networks 110 (e.g., one or more wired networks, wireless networks, and/or the like). Network(s) 110 can interface computing device(s) 10, 20, 30, 40, and/or 50 with one another and/or with computing system 112.

Computing device 10 can include one or more processor(s) 102, one or more communication interfaces 104, and memory 106 (e.g., one or more hardware components for storing executable instructions, data, and/or the like). Communication interface(s) 104 can enable computing device 10 to communicate with computing device(s) 20, 30, 40, and/or 50 and/or with computing system 112. Memory 106 can include (e.g., store, and/or the like) instructions 108. When executed by processor(s) 102, instructions 108 can cause computing device 10 to perform one or more operations, functions, and/or the like indicated herein. It will be appreciated that computing device(s) 20, 30, 40, and/or 50 can include one or more of the components indicated above with respect to computing device 10.

Computing system 112 can include one or more processor(s) 114, one or more communication interfaces 116, and memory 118 (e.g., one or more hardware components for storing executable instructions, data, and/or the like). Communication interface(s) 116 can enable computing system 112 to communicate with computing device(s) 10, 20, 30, 40, and/or 50. Memory 118 can include (e.g., store, and/or the like) instructions 120. When executed by processor(s) 114, instructions 120 can cause computing system 112 to perform one or more operations, functions, and/or the like indicated herein.

Unless explicitly indicated otherwise, the operations, functions, and/or the like indicated herein can be performed by computing device(s) 10, 20, 30, 40, and/or 50 and/or computing system 112 (e.g., by computing device 10, 20, 30, 40, or 50, by computing system 112, by a combination of one or more of computing device(s) 10, 20, 30, 40, and/or 50 and/or computing system 112, and/or the like).

FIGS. 2A-E depict an example event sequence according to example embodiments of the present disclosure.

Figure 2A:
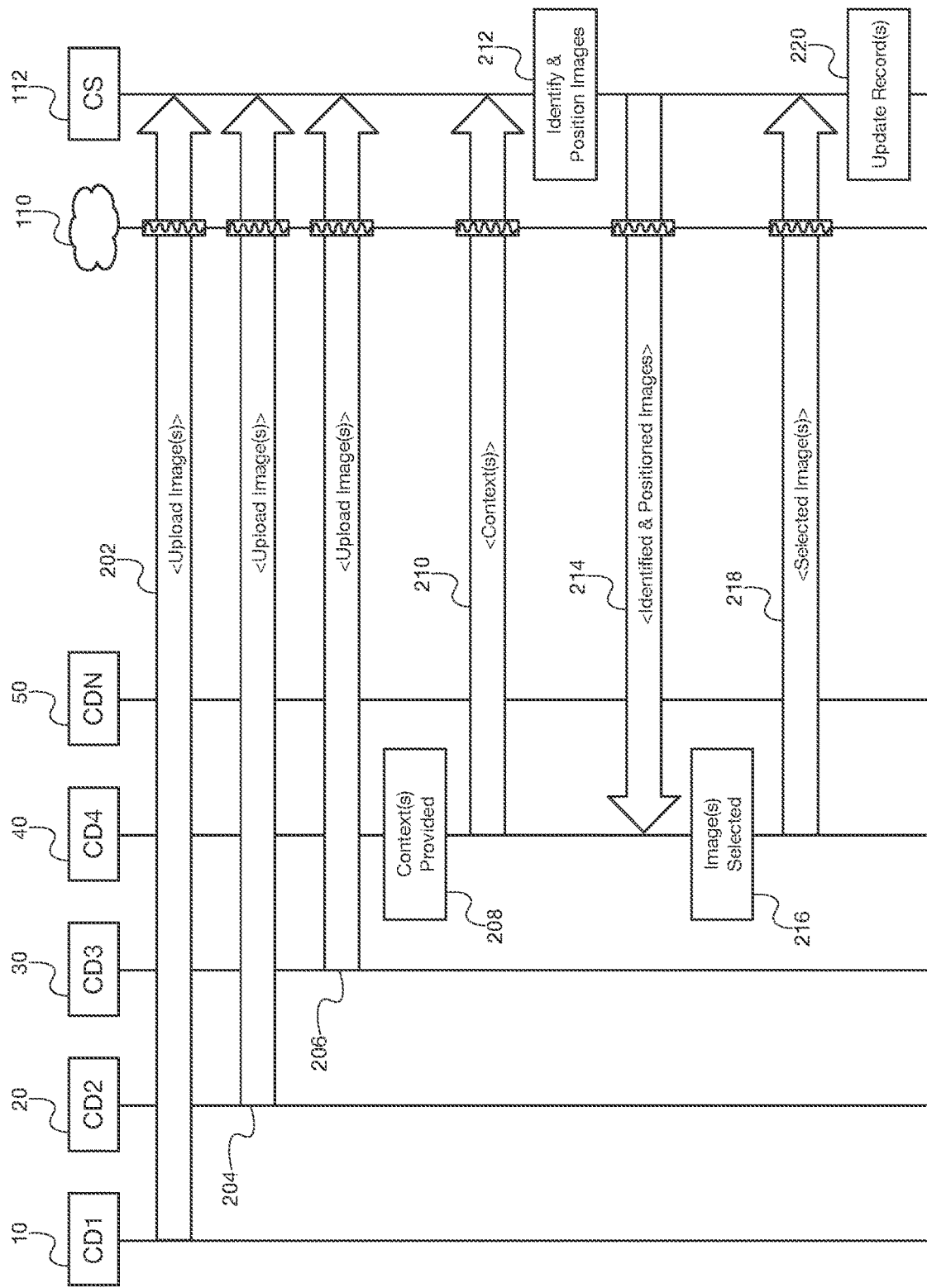
FIGS. 2A-E depict an example event sequence according to example embodiments of the present disclosure.

Referring to FIG. 2A, at (202), computing device 10 can communicate (e.g., via network(s) 110 (as indicated by the pattern-filled box over the line extending downward from network(s) 110), and/or the like) data indicating one or more animated images (e.g., graphics interchange format (GIF) images, and/or the like), advertisements, advertisement content, contexts in which to present such animated image(s), advertisement(s), advertisement content, and/or the like to computing system 112, which can receive and store such data, one or more records generated based at least in part thereon, and/or the like. For example, computing system 112 can be remotely located from computing device(s) 10, 20, 30, 40, and/or 50 and can receive uploads to, store, index, manage, and/or the like a corpus of animated images, one or more records regarding such corpus, and/or the like.

Similarly, at (204), computing device 20 can communicate data indicating one or more animated images, advertisements, advertisement content, contexts in which to present such animated image(s), advertisement(s), advertisement content, and/or the like to computing system 112, which can receive and store such data, one or more records generated based at least in part thereon, and/or the like; and, at (206), computing device 30 can communicate data indicating one or more animated images, advertisements, advertisement content, contexts in which to present such animated image(s), advertisement(s), advertisement content, and/or the like to computing system 112, which can receive and store such data, one or more records generated based at least in part thereon, and/or the like.

Computing device 40 can be a user device (e.g., one or more associated computing devices at least temporarily associated with a particular user, user account, and/or the like). Computing device 50 can be a user device (e.g., one or more associated computing devices at least temporarily associated with a different and distinct user, user account, and/or the like) different and distinct from computing device 40.

Figure 3A:
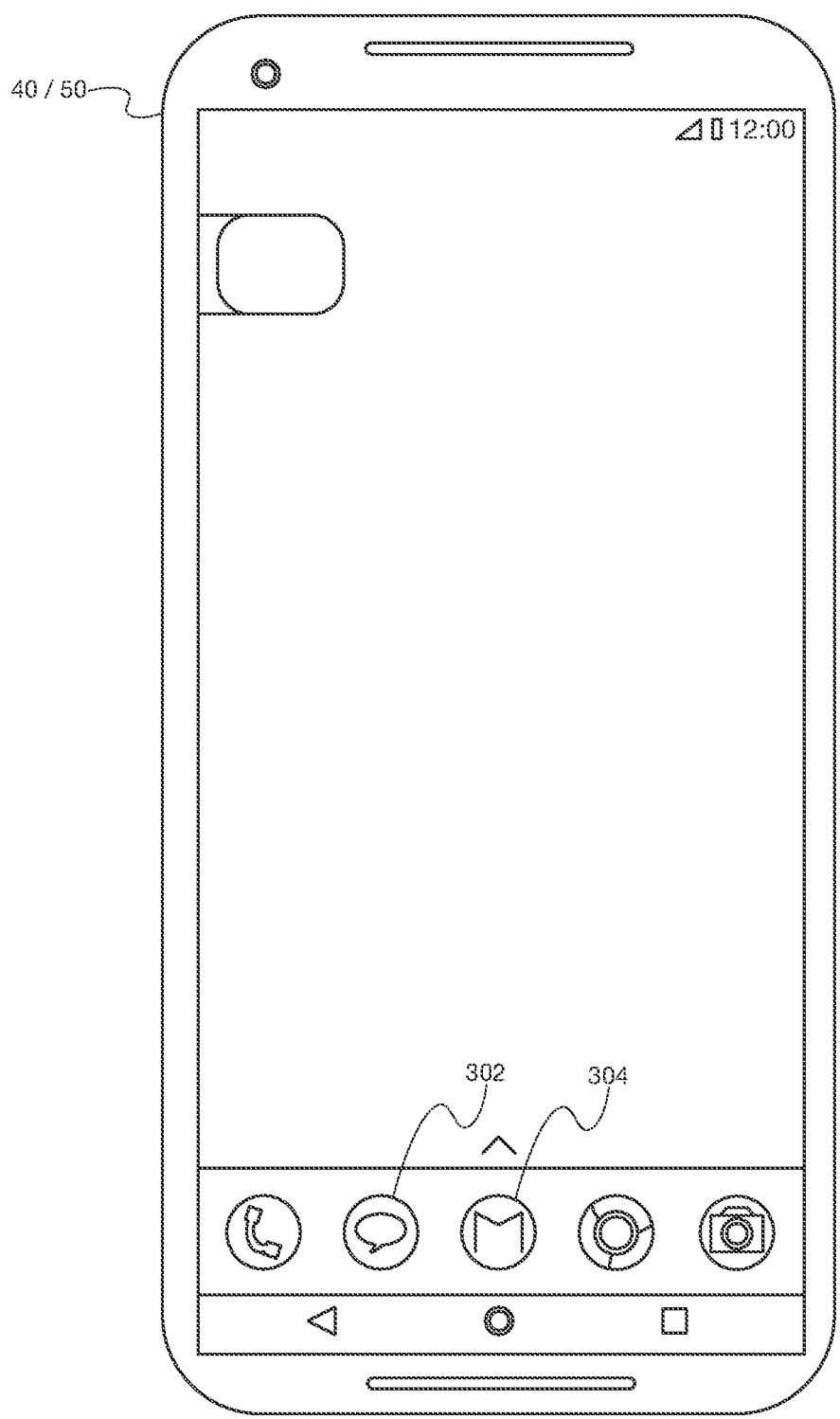
FIGS. 3A-Y depict example graphical user interfaces (GUIs) according to example embodiments of the present disclosure.

Computing device(s) 40 and/or 50 can execute one or more different and distinct applications. For example, referring to FIG. 3A, computing device(s) 40 and/or 50 can execute an application (e.g., a messaging application, and/or the like) associated with graphical user interface (GUI) element 302, a different and distinct application (e.g., an email application, and/or the like) associated with element 304, and/or the like.

Figure 3B:
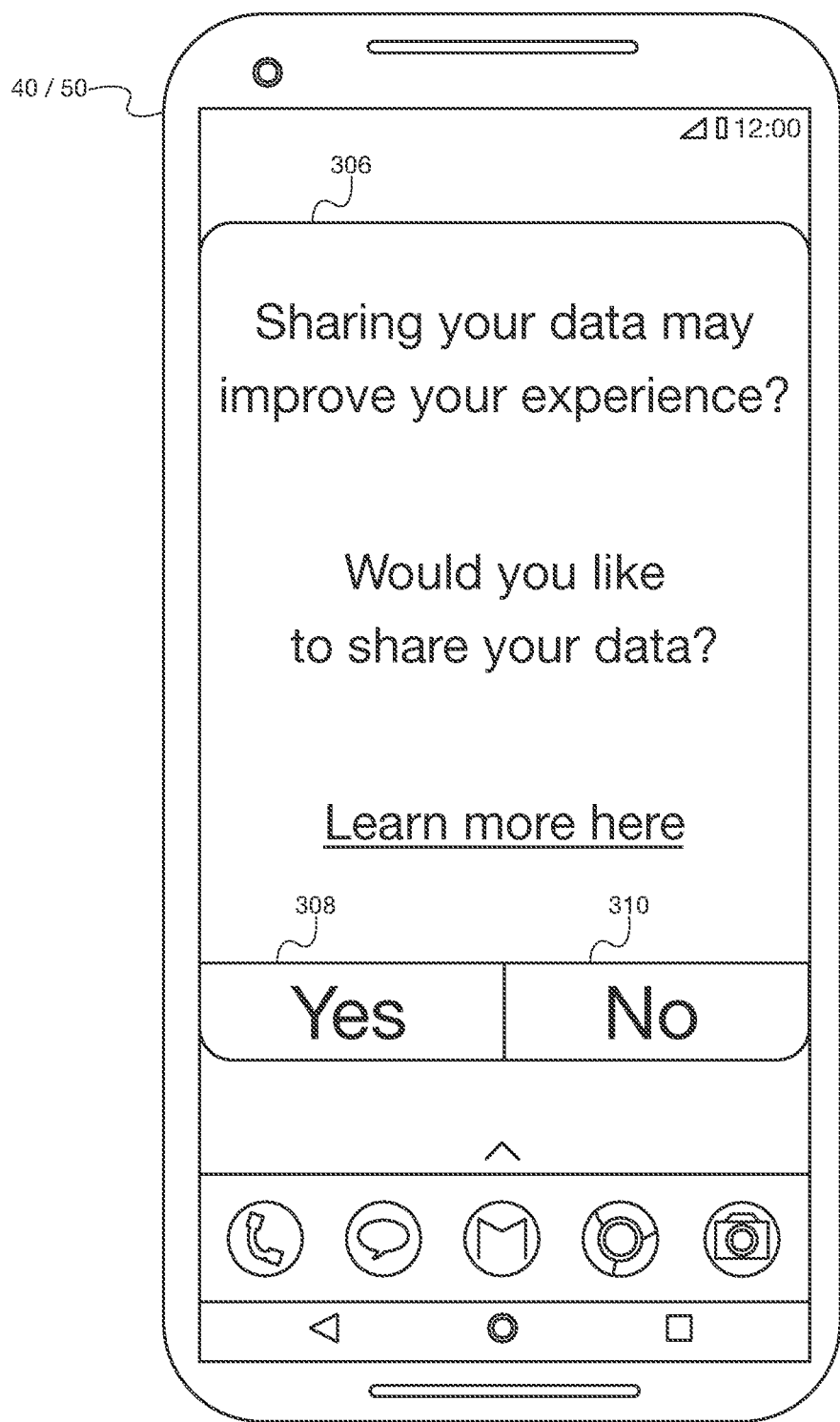

Referring to FIG. 3B, in some embodiments (e.g., to mitigate potential privacy concerns, and/or the like), one or more users of computing device(s) 40 and/or 50 can be provided (e.g., via element 306, and/or the like) with information regarding collection of certain data, and/or the like, one or more controls (e.g., via element(s) 308 and/or 310, and/or the like) for allowing the user(s) to make one or more elections as to if and/or when the methods, systems, functions, operations, and/or the like indicated herein can enable collection of certain data, and/or the like (e.g., presented by and/or input into the application(s), the dynamic keyboard interface indicated herein, and/or the like). Additionally or alternatively, certain data (e.g., presented by and/or input into the application(s), the dynamic keyboard interface indicated herein, and/or the like) can be treated in one or more ways before being stored, utilized, and/or the like (e.g., so personally identifiable information can be removed, and/or the like). For example, a user's identity, data associated therewith, and/or the like can be treated so that no personally identifiable information can be determined for the user, and/or the like. Thus, the user(s) can have control over what data is collected about them, how that information is used, what information they are provided, and/or the like.

Figure 3C:
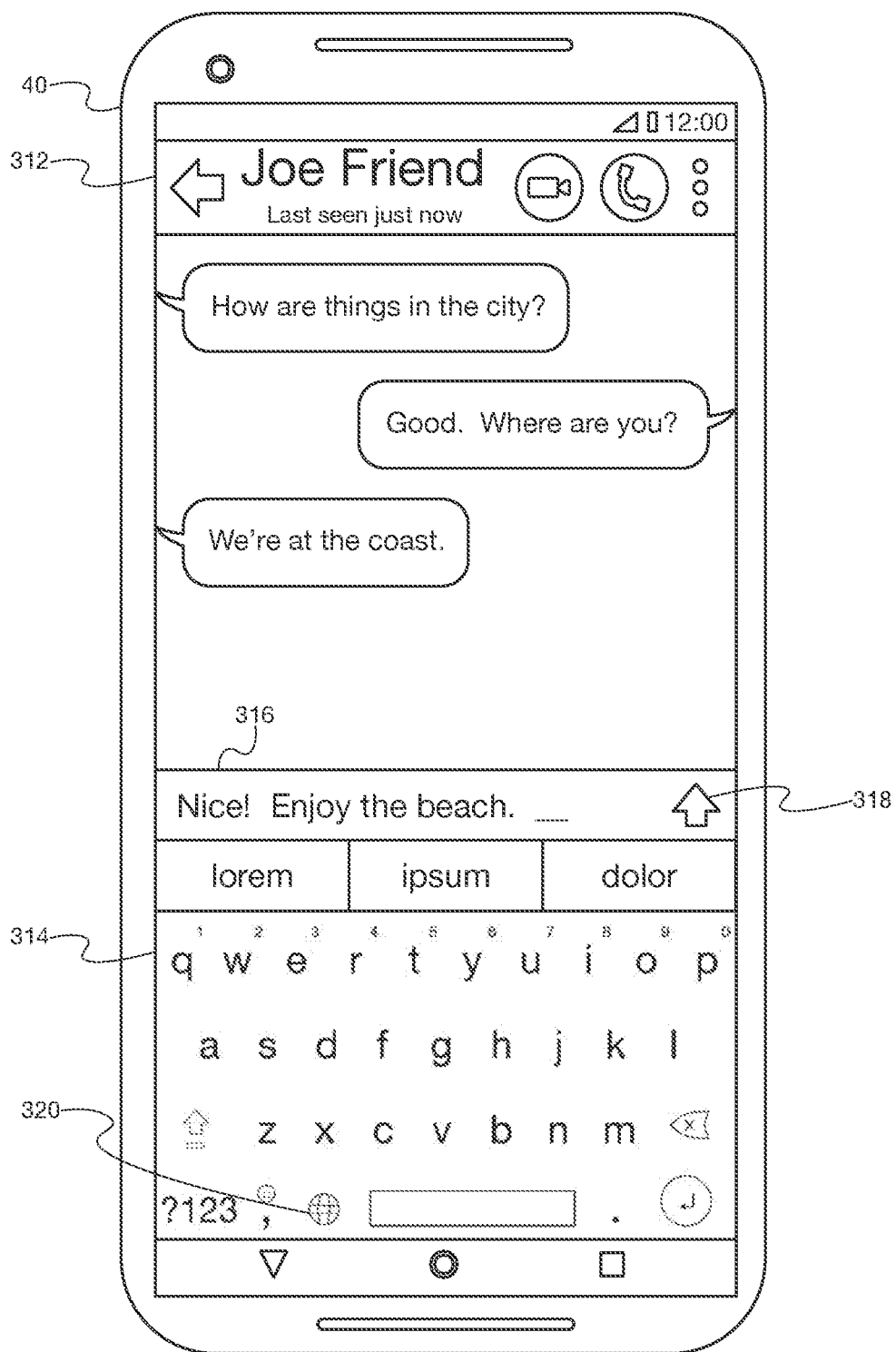

In accordance with aspects of the disclosure, a dynamic keyboard interface (e.g., for use via a touchscreen, and/or the like) can be provided (e.g., as part of an operating system (OS), third-party application, plugin, and/or the like) to, by, and/or the like computing device(s) 40 and/or 50. For example, referring to FIG. 3C, portion 314 of the illustrated GUI can be associated with such a dynamic keyboard interface. One or more aspects of the dynamic keyboard interface can be configured to provide access (e.g., via search functionality, suggestion functionality, browsing functionality, and/or the like) to the corpus of animated images uploaded to, stored by, indexed by, managed by, and/or the like computing system 112. The dynamic keyboard interface can be provided in association with one or more of the application(s) executed by computing device(s) 40 and/or 50. For example, portion 312 can be associated with the application (e.g., the messaging application, and/or the like) associated with element 302, and, as illustrated, the dynamic keyboard interface can be provided in association with such application.

Element 316 can correspond to an input area (e.g., for composing a message, and/or the like), and element 318 can correspond to an option to communicate the data located in such input area to the application associated with portion 312 (e.g., for subsequent communication over network(s) 110 to a computing device associated with "Joe Friend," and/or the like).

Element 320 can be configured to cause the dynamic keyboard interface to toggle, flip, rotate, and/or the like between various different keyboards, for example, associated with different languages, alphabets, and/or the like (e.g., the illustrated qwerty keyboard, and/or the like). In accordance with aspects of the disclosure, such keyboards can include an animated-image keyboard configured to present (e.g., for browsing, selection, and/or the like) various different animated images.

Referring again to FIG. 2A, at (208), a user can perform one or more actions that provide one or more different and distinct contexts associated with computing device 40. The context(s) provided can be of computing device 40, the dynamic keyboard interface, the application associated with portion 312, and/or the like. For example, the user can locate computing device 40 at a particular geographic location, interact with the application associated with portion 312 via its interface, and/or the like.

At (210), computing device 40 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 312, and/or the like (e.g., "We're at the coast."; "Nice! Enjoy the beach."; and/or the like).

Based at least in part on the data indicating the context(s), the record(s) regarding the corpus of animated images, and/or the like, at (212), computing system 112 can identify a plurality of different animated images associated with the context(s) for presentation by the dynamic keyboard interface in association with the application associated with portion 312 (e.g., animated images relevant, responsive, and/or the like to the context(s)).

In some embodiments, one or more of the plurality of different animated images associated with the context(s) can include one or more advertisements (e.g., for one or more products, services, media content items, and/or the like). For example, such animated image(s) can include advertisement content, data (e.g., a link, and/or the like) configured to cause an application executed by computing device(s) 40 and/or 50 (e.g., a web browser, an application associated with the subject, source, and/or the like of the advertisement, and/or the like) to present, navigate to, and/or the like content associated with the advertisement, advertisement content, and/or the like.

In accordance with aspects of the disclosure, based at least in part on the data indicating the context(s), the record(s) regarding the corpus of animated images, and/or the like, computing system 112 can determine, for each of one or more animated images included in the plurality of different animated images associated with the context(s), a position within the dynamic keyboard interface for presenting the animated image.

At (214), computing system 112 can generate data indicating the plurality of different animated images associated with the context(s), their respective determined positions, and/or the like and can communicate such data to computing device 40 (e.g., to the dynamic keyboard interface), which can receive the data.

Figure 3D:
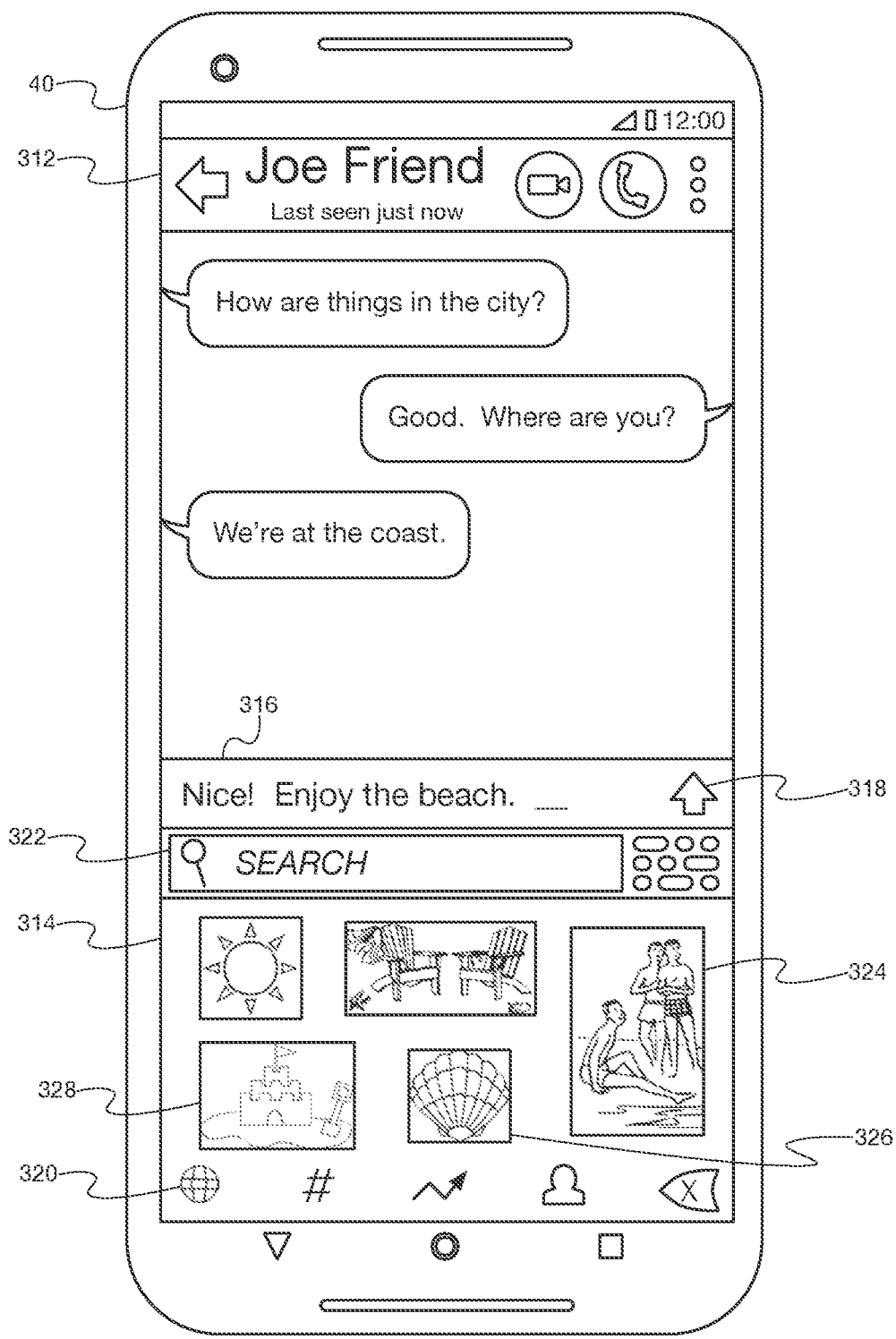

Referring to FIG. 3D, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the context(s) based at least in part on their respective determined positions. For example, the plurality of different animated images associated with the context(s) can be presented in an ordered, sorted, and/or the like fashion (e.g., animated images determined to be more relevant, responsive, and/or the like to the context(s) can be presented earlier, more prominently, and/or the like).

As illustrated, multiple different animated images from the plurality of different animated images associated with the context(s) can be simultaneously displayed by the dynamic keyboard interface alongside one another. For example, the dynamic keyboard interface can simultaneously display animated images 324, 326, and 328, amongst others of the plurality of different animated images associated with the context(s) and/or the like. It will be appreciated that the plurality of different animated images associated with the context(s) can include additional animated images (not illustrated), which can, for example, be displayed by interacting with the interface (e.g., swiping left, and/or the like).

Figure 3E:
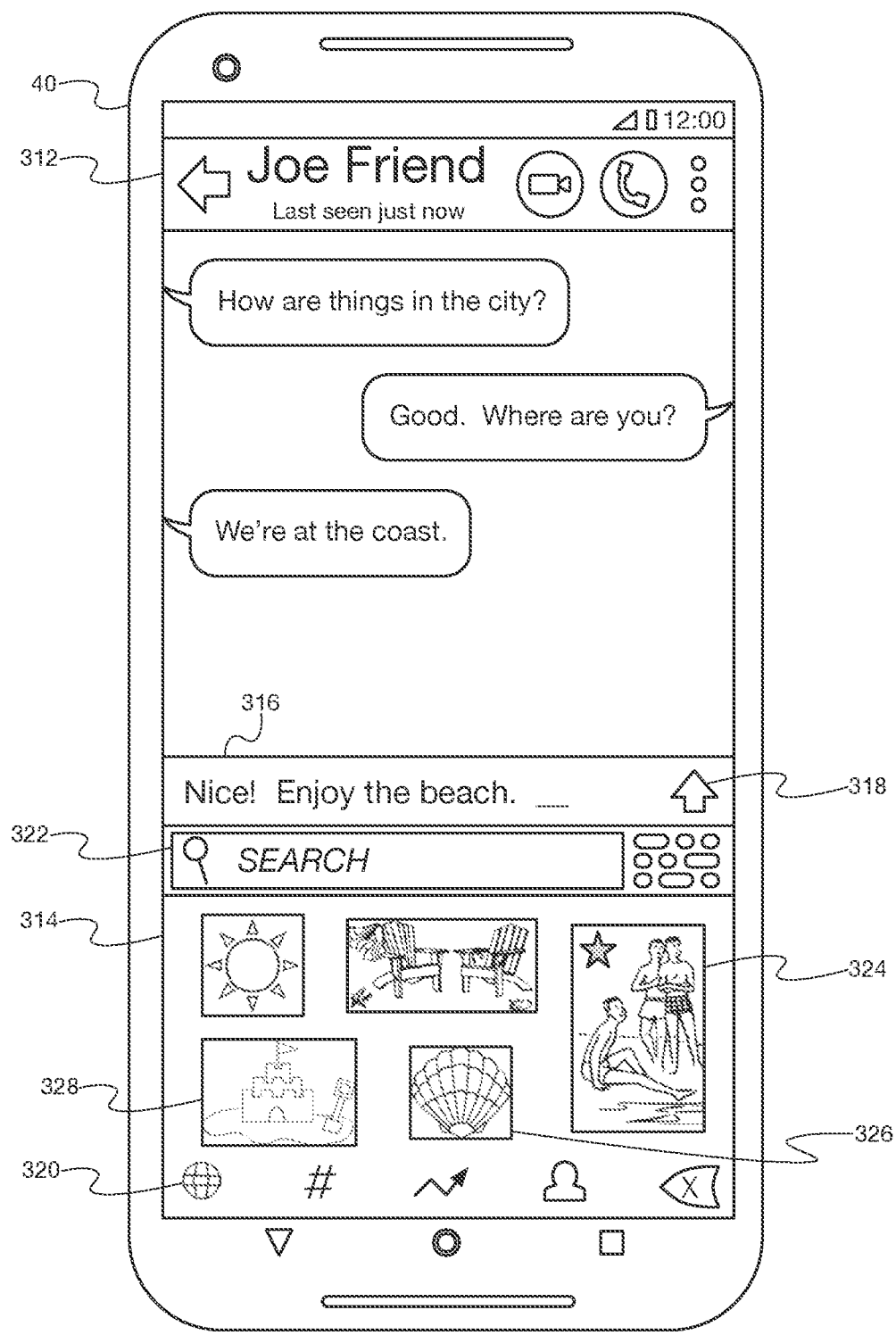

Referring again to FIG. 2A, at (216), a user can select one or more particular animated images from amongst the plurality of different animated images associated with the context(s) via the dynamic keyboard interface. In some embodiments, the user can select one or more of the particular animated image(s) for communication (e.g., input, pasting, and/or the like) by the dynamic keyboard interface to the application associated with portion 312 (FIG. 3D). Additionally or alternatively, the user can select one or more of the particular animated image(s) for future accessibility within the dynamic keyboard interface (e.g., designate such particular animated image(s) for frequent use, "favorite" them, and/or the like). For example, referring to FIG. 3E, the user can select animated image 324 for future accessibility within the dynamic keyboard interface (e.g., as illustrated by the star overlaid on animated image 324, and/or the like).

At (218), computing device 40 can generate data indicating the selection(s), selection type(s) (e.g., for future accessibility, and/or the like), particular animated image(s) selected (e.g., animated image 324, and/or the like) and can communicate such data to computing system 112, which can receive the data and, at (220), can update the record(s) regarding the corpus of animated images based at least in part thereon.

Figure 2B:
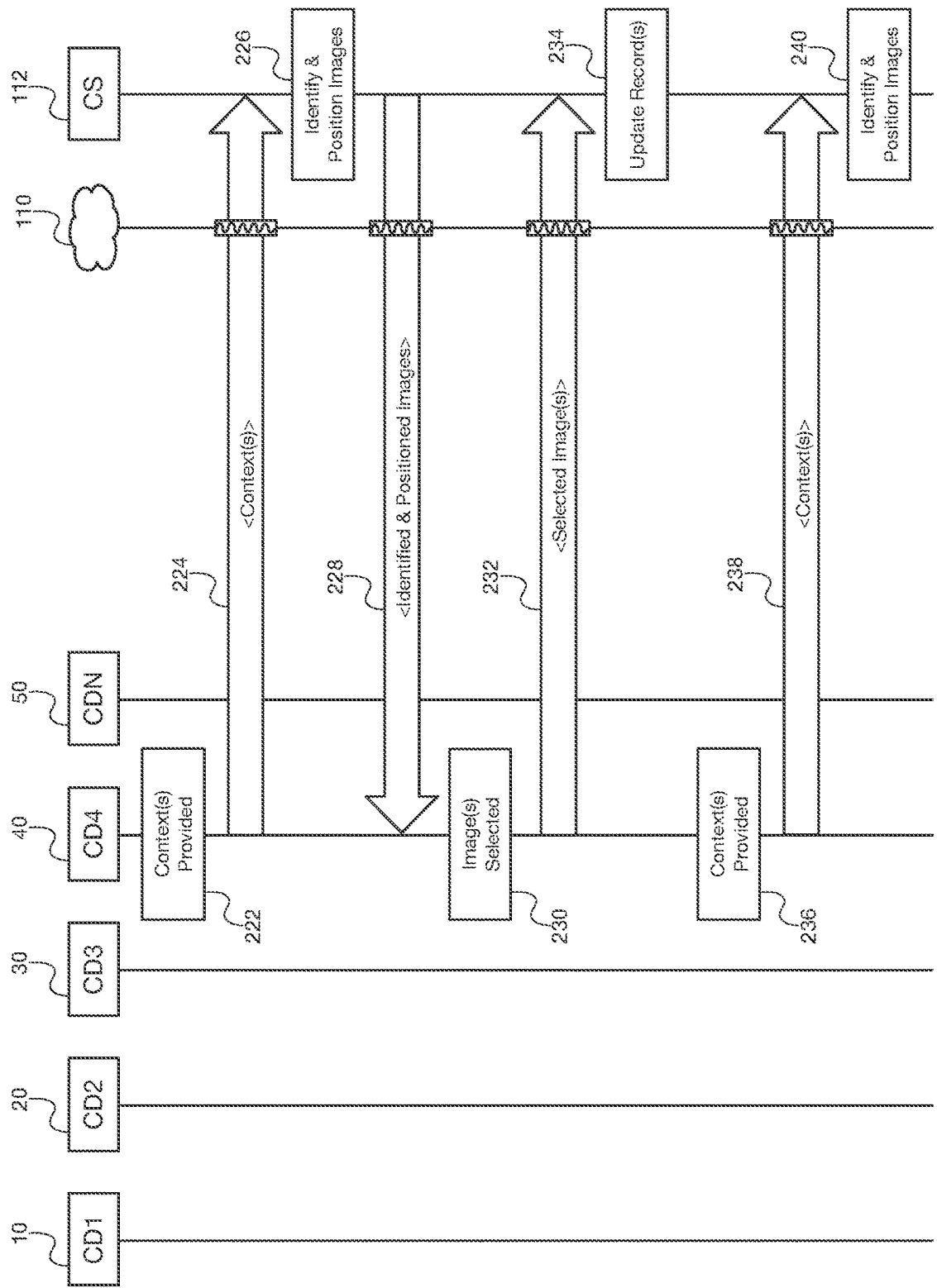
Figure 3F:
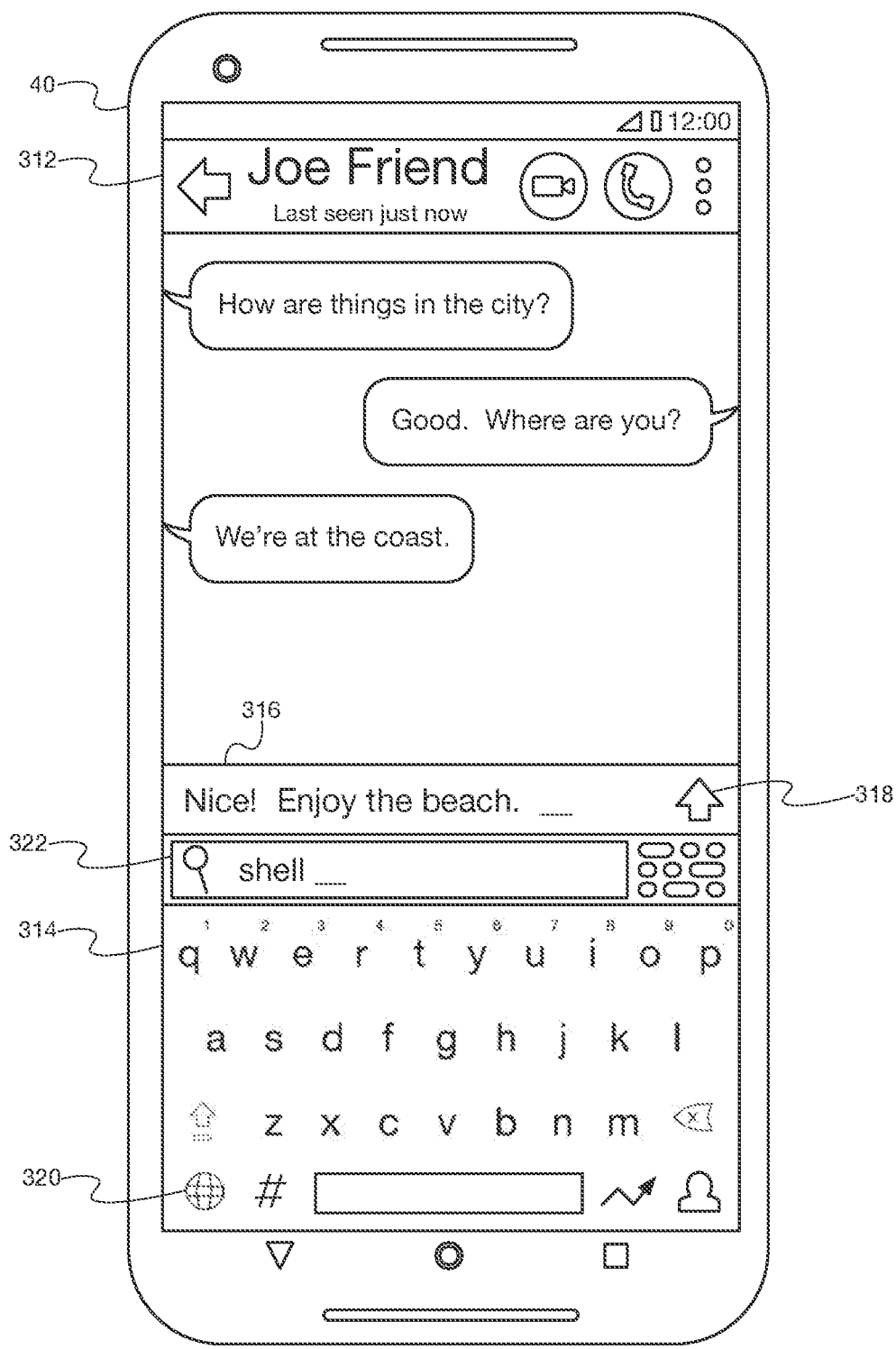

Referring to FIG. 2B, at (222), a user can perform one or more actions that provide one or more different and distinct current contexts associated with computing device 40. The context(s) provided can be of computing device 40, the dynamic keyboard interface, the application associated with portion 312, and/or the like. For example, element 322 can correspond to a search box for inputting one or more search terms to be used at least in part to identify one or more animated images, and/or the like, and, referring to FIG. 3F, the user can invoke element 322 and utilize the illustrated keyboard to input one or more search terms (e.g., "shell," and/or the like).

At (224), computing device 40 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate the inputted search term(s), and/or the like.

Based at least in part on the data indicating the current context(s), the data indicating the previous context(s) (e.g., received at (210), and/or the like), the data indicating the previous selection(s), selection type(s), particular animated image(s) selected, and/or the like (e.g., received at (218), and/or the like), the record(s) regarding the corpus of animated images, and/or the like, at (226), computing system 112 can identify a plurality of different animated images associated with the current context(s) for presentation by the dynamic keyboard interface in association with the application associated with portion 312 (e.g., animated images relevant, responsive, and/or the like to the current context(s)). In some embodiments, one or more of the plurality of different animated images associated with the current context(s) can include one or more advertisements.

Based at least in part on the data indicating the current context(s), the data indicating the previous context(s) (e.g., received at (210), and/or the like), the data indicating the previous selection(s), selection type(s), particular animated image(s) selected, and/or the like (e.g., received at (218), and/or the like), the record(s) regarding the corpus of animated images, and/or the like, computing system 112 can determine, for each of one or more animated images included in the plurality of different animated images associated with the current context(s), a position within the dynamic keyboard interface for presenting the animated image.

Figure 3G:
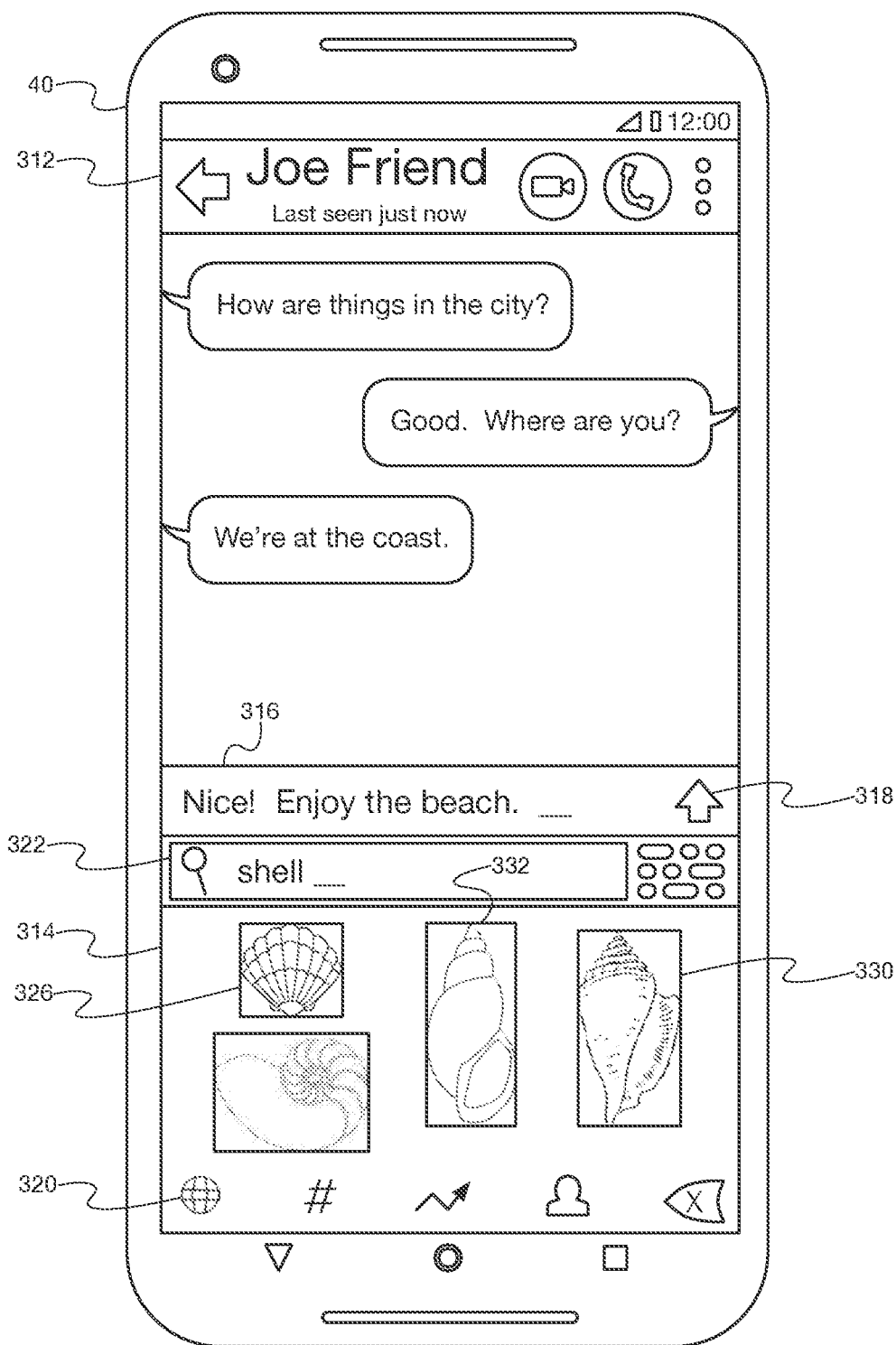

At (228), computing system 112 can generate data indicating the plurality of different animated images associated with the current context(s), their respective determined positions, and/or the like and can communicate such data to computing device 40 (e.g., to the dynamic keyboard interface), which can receive the data and, referring to FIG. 3G, can toggle (e.g., from the qwerty keyboard, and/or the like) to the illustrated animated-image keyboard, and/or the like, which can present the plurality of different animated images associated with the current context(s) based at least in part on their respective determined positions. For example, the plurality of different animated images associated with the current context(s) can be presented in an ordered, sorted, and/or the like fashion (e.g., animated images determined to be more relevant, responsive, and/or the like to the current context(s) can be presented earlier, more prominently, and/or the like).

As illustrated, multiple different animated images from the plurality of different animated images associated with the current context(s) can be simultaneously displayed by the dynamic keyboard interface alongside one another. For example, the dynamic keyboard interface can simultaneously display animated images 326, 330, and 332, amongst others of the plurality of different animated images associated with the current context(s), and/or the like.

Figure 3H:
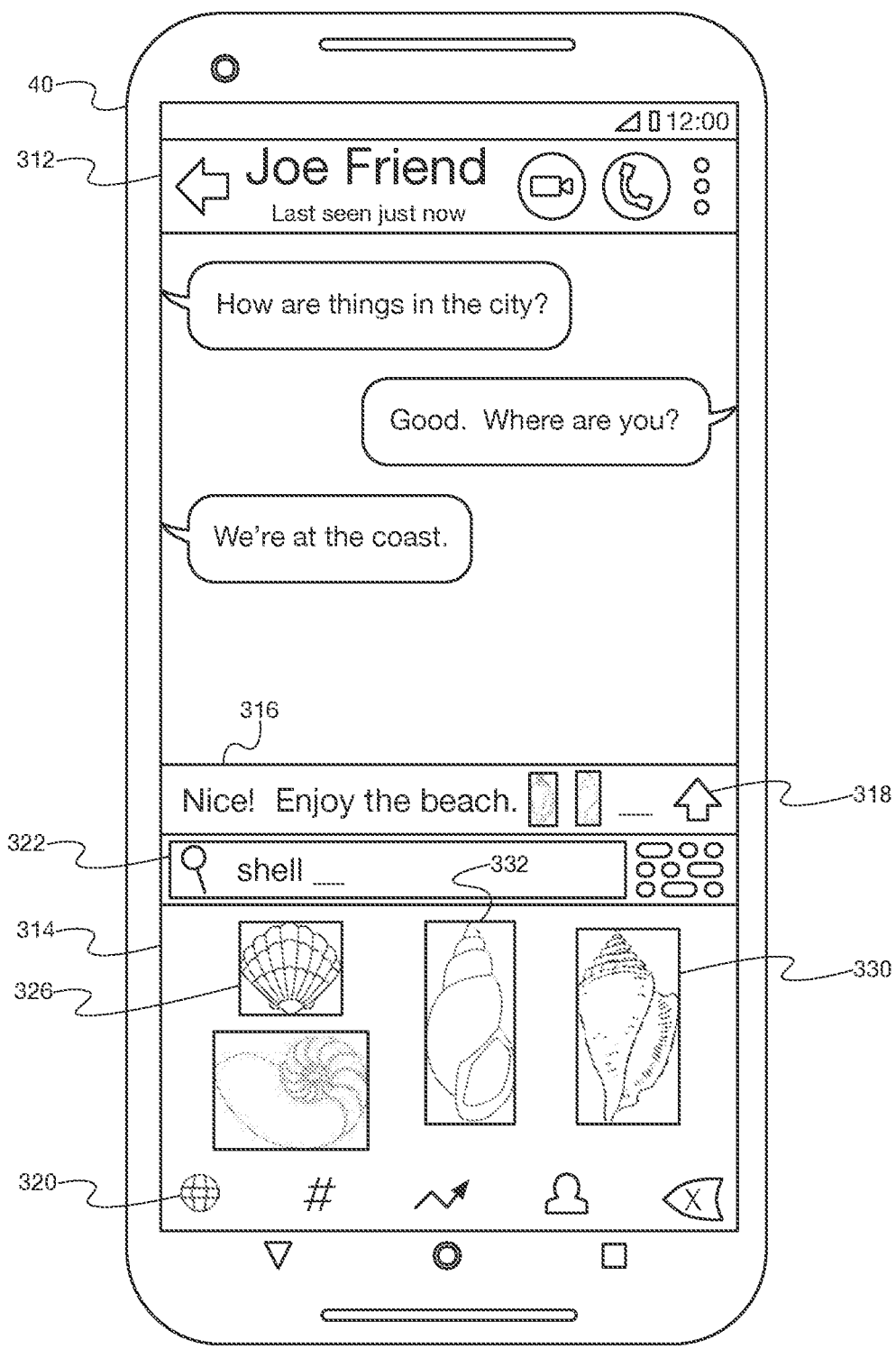
Figure 3I:
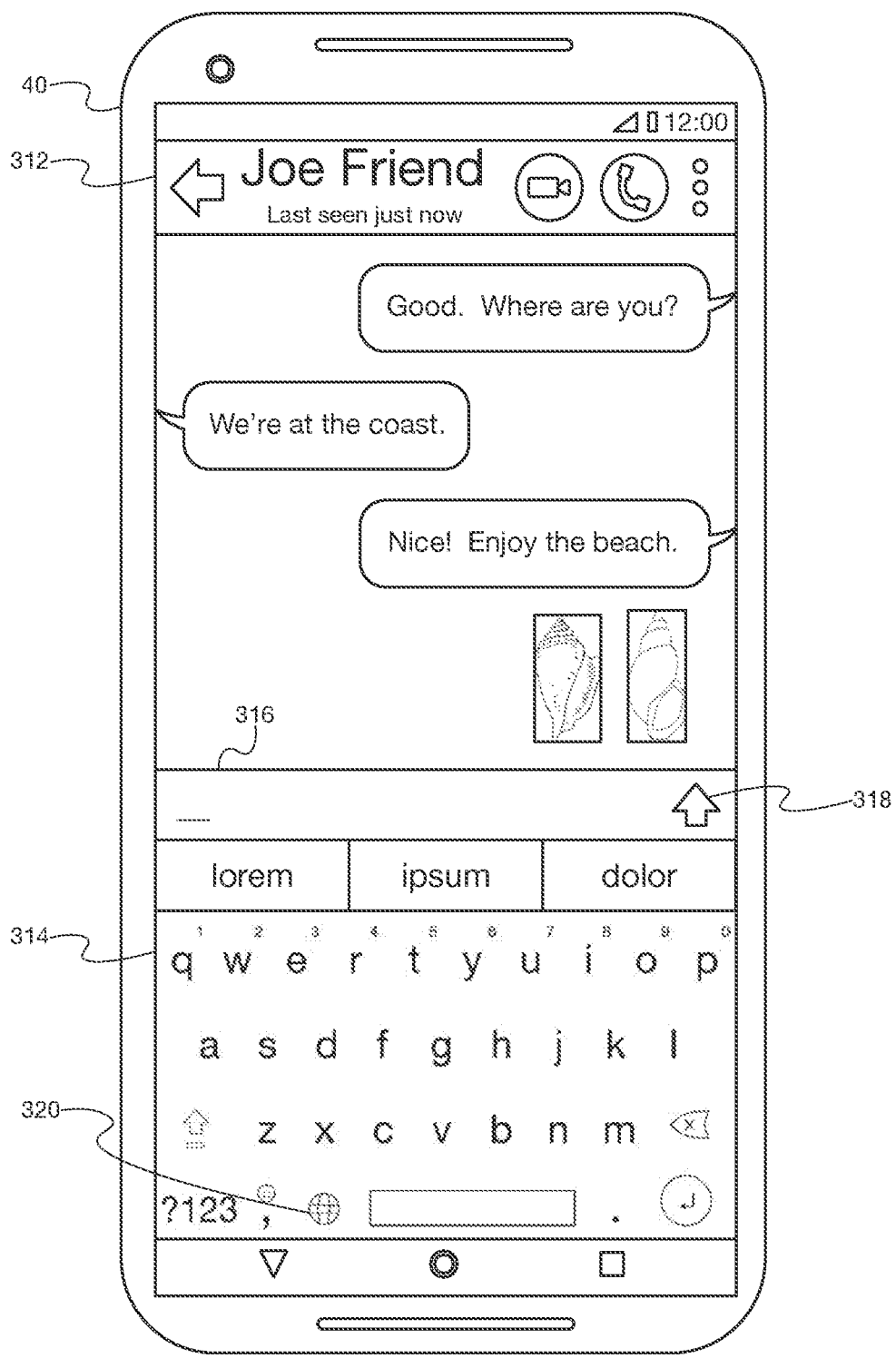

At (230), a user can select one or more particular animated images from amongst the plurality of different animated images associated with the current context(s) via the dynamic keyboard interface. For example, referring to FIG. 3H, the user can select animated images 330 and 332 for communication by the dynamic keyboard interface to the application associated with portion 312, and/or the like, and, referring to FIG. 3I, responsive to the user invoking element 318, and/or the like, the dynamic keyboard interface can communicate animated images 330 and 332 to the application associated with portion 312, and/or the like.

At (232), computing device 40 can generate data indicating the selection(s), selection type(s) (e.g., for communication to the application associated with portion 312, and/or the like), particular animated image(s) selected (e.g., animated images 330 and 332, and/or the like) and can communicate such data to computing system 112, which can receive the data and, at (234), can update the record(s) regarding the corpus of animated images based at least in part thereon.

Figure 3J:
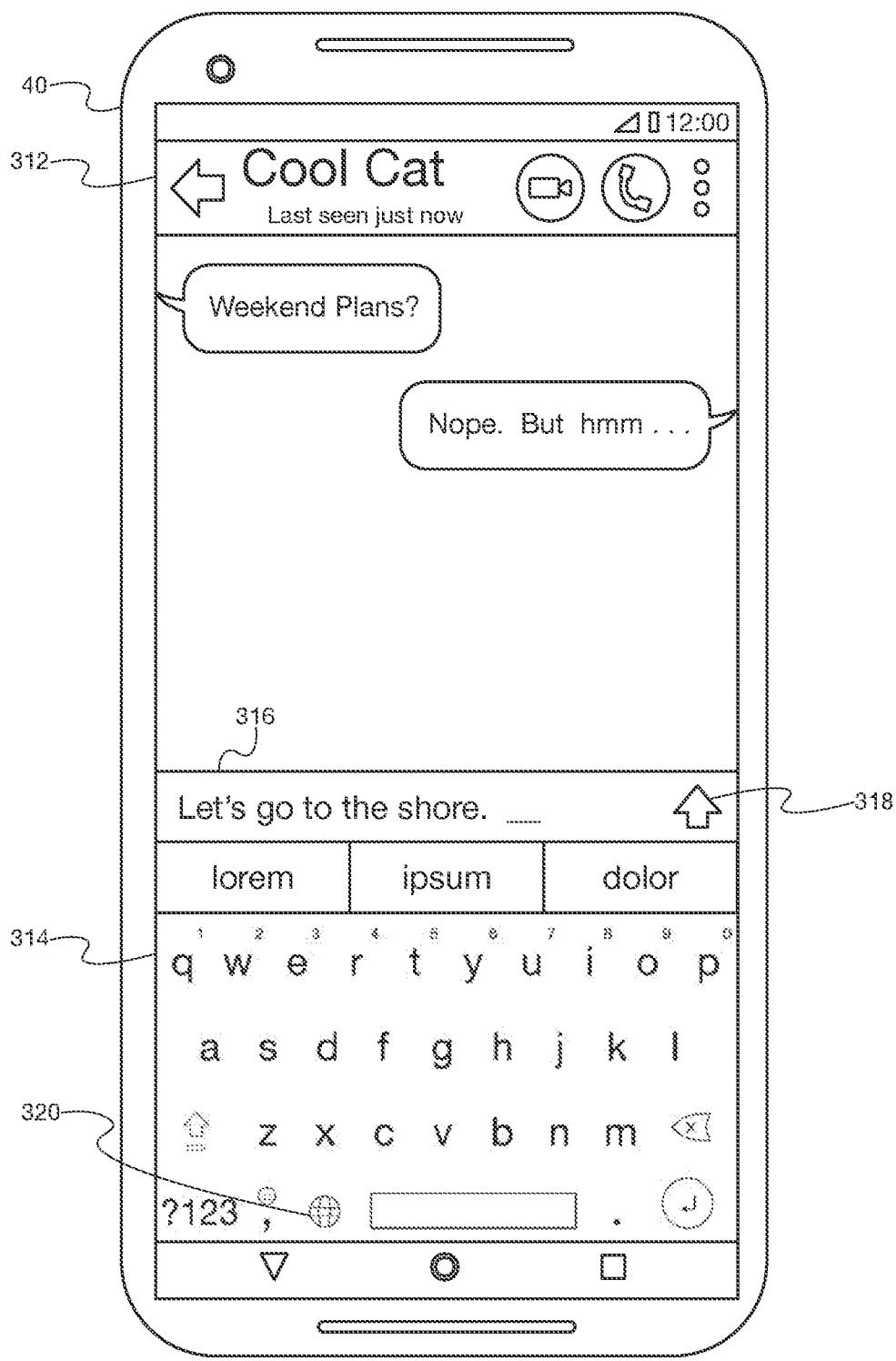

At (236), a user can perform one or more actions that provide one or more different and distinct current contexts associated with computing device 40. The context(s) provided can be of computing device 40, the dynamic keyboard interface, the application associated with portion 312, and/or the like. For example, referring to FIG. 3J, the user can interact with the application associated with portion 312 via its interface (e.g., switch from the message conversation with "Joe Friend" to a message conversation with "Cool Cat," and/or the like).

At (238), computing device 40 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 312, and/or the like (e.g., "Let's go to the shore."; and/or the like).

Based at least in part on the data indicating the current context(s), the data indicating the previous context(s) (e.g., received at (210), (224), and/or the like), the data indicating the previous selection(s), selection type(s), particular animated image(s) selected, and/or the like (e.g., received at (218), (232), and/or the like), the record(s) regarding the corpus of animated images, and/or the like, at (240), computing system 112 can identify a plurality of different animated images associated with the current context(s) for presentation by the dynamic keyboard interface in association with the application associated with portion 312 (e.g., animated images relevant, responsive, and/or the like to the current context(s)). In some embodiments, one or more of the plurality of different animated images associated with the current context(s) can include one or more advertisements.

Based at least in part on the data indicating the current context(s), the data indicating the previous context(s) (e.g., received at (210), (224), and/or the like), the data indicating the previous selection(s), selection type(s), particular animated image(s) selected, and/or the like (e.g., received at (218), (232), and/or the like), the record(s) regarding the corpus of animated images, and/or the like, computing system 112 can determine, for each of one or more animated images included in the plurality of different animated images associated with the current context(s), a position within the dynamic keyboard interface for presenting the animated image.

Figure 2C:
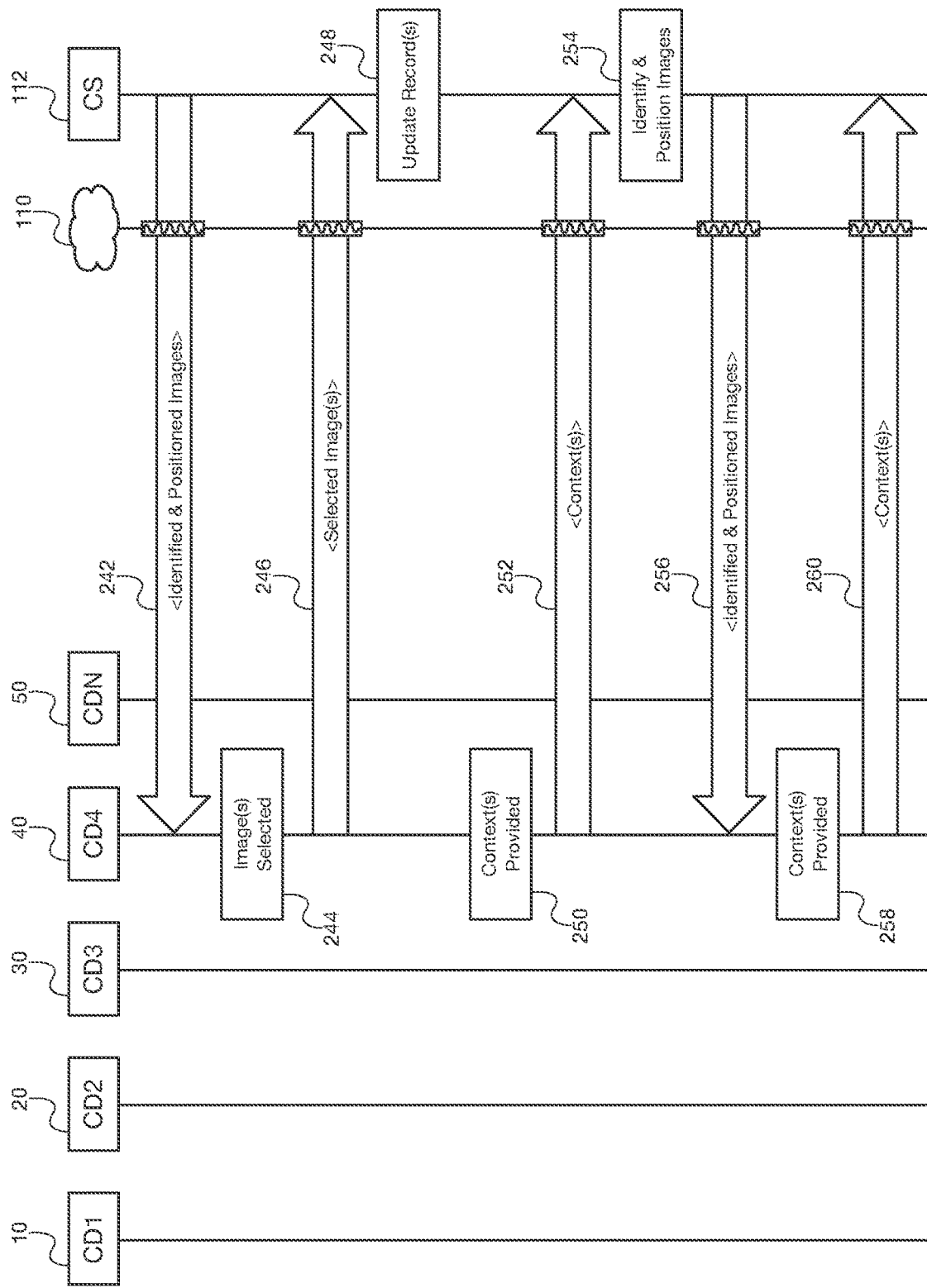

Referring to FIG. 2C, at (242), computing system 112 can generate data indicating the plurality of different animated images associated with the current context(s), their respective determined positions, and/or the like and can communicate such data to computing device 40 (e.g., to the dynamic keyboard interface), which can receive the data.

Figure 3K:
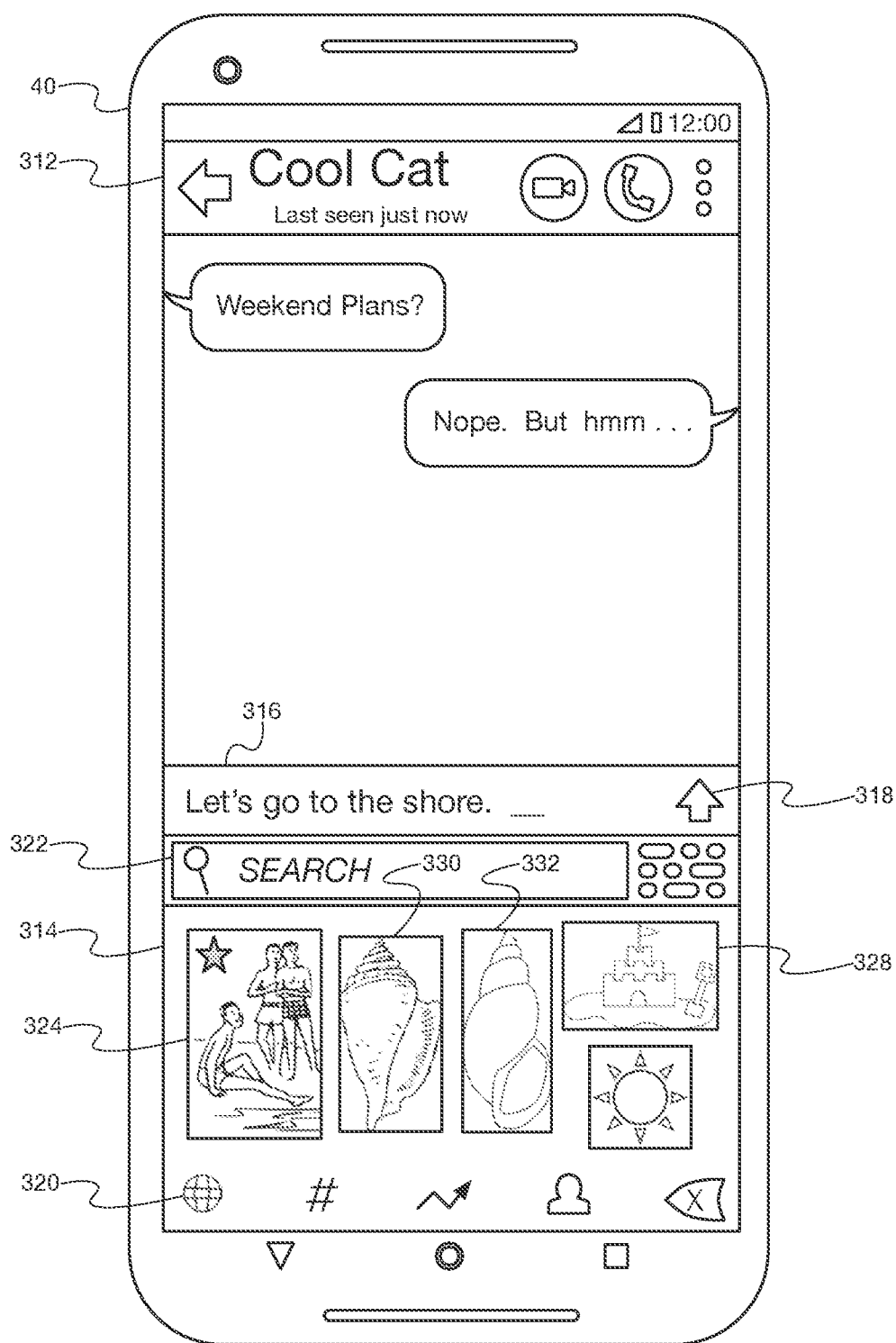

Referring to FIG. 3K, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the current context(s) based at least in part on their respective determined positions. For example, the plurality of different animated images associated with the current context(s) can be presented in an ordered, sorted, and/or the like fashion (e.g., animated images determined to be more relevant, responsive, and/or the like to the current context(s) can be presented earlier, more prominently, and/or the like).

As illustrated, multiple different animated images from the plurality of different animated images associated with the current context(s) can be simultaneously displayed by the dynamic keyboard interface alongside one another. For example, the dynamic keyboard interface can simultaneously display animated images 324, 328, 330, and 332, amongst others of the plurality of different animated images associated with the current context(s), and/or the like.

In some embodiments, the animated image(s) included in the plurality of different animated images associated with the current context(s) can include one or more of the particular animated image(s) previously selected (e.g., animated images 324, 330, 332, and/or the like). In some of such embodiments, the position within the dynamic keyboard interface for presenting such particular animated image(s) can be determined based at least in part on their having been previously selected, the previous context(s) associated with their selection, and/or the like. For example, such particular animated image(s) can be presented earlier, more prominently, and/or the like than they otherwise would have been (e.g., absent their previous selection, and/or the like). In some embodiments, one or more of such particular animated image(s) can include one or more advertisements.

As previously indicated, in some embodiments, the data indicating the current context(s) can indicate data presented by and/or input into the dynamic keyboard interface, the application associated with portion 312, and/or the like (e.g., "Let's go to the shore."; and/or the like). In some of such embodiments, for one or more animated images of the animated image(s) included in the plurality of different animated images associated with the current context(s) (e.g., animated images 324, 330, 332, and/or the like), determining the position(s) within the dynamic keyboard interface for presenting such animated image(s) can include determining the data presented by and/or input into the dynamic keyboard interface, one or more applications associated with one or more of the previous context(s), and/or the like indicated by the data indicating one or more of the previous context(s) (e.g., "We're at the coast."; "Nice! Enjoy the beach."; and/or the like) corresponds at least in part to the data presented by and/or input into the dynamic keyboard interface, the application associated with portion 312, and/or the like indicated by the data indicating the current context(s) (e.g., "Let's go to the shore."; and/or the like).

In some embodiments, data indicating one or more of the previous context(s) can indicate a human-language setting associated with a user device on which the application associated with the previous context is executed; a geographic area to which such user device is registered; a network identifier associated with such user device; a geographic location of such user device associated with the selection of the particular animated image(s); a time associated with the selection of the particular animated image(s); a time of day associated with the selection of the particular animated image(s); a date associated with the selection of the particular animated image(s); a day of week associated with the selection of the particular animated image(s); a month associated with the selection of the particular animated image(s); a year associated with the selection of the particular animated image(s); a size of an audience associated with the selection of the particular animated image(s); an entity that provided one or more of the particular animated image(s) and/or content included in one or more of the particular animated image(s); and/or the like. In some of such embodiments, the data indicating the current context(s) can include data corresponding at least in part to the human-language setting, the geographic area, the network identifier, the geographic location, the time, the time of day, the date, the day of week, the month, the year, the size of the audience, the entity, and/or the like.

In some embodiments, data indicating one or more of the previous context(s) can indicate an animated image previously selected via the dynamic keyboard interface, a time when the animated image previously selected via the dynamic keyboard interface was selected, and/or the like. In some of such embodiments, the data indicating the current context(s) can include data indicating selection of the animated image previously selected via the dynamic keyboard interface, a time associated with the selection of the animated image previously selected via the dynamic keyboard interface, and/or the like.

In some embodiments, data indicating one or more of the previous context(s); the data indicating the previous selection(s), selection type(s), particular animated image(s) selected, and/or the like; the record(s) regarding the corpus of animated images; and/or the like can indicate an amount of time between the selection of the particular animated image(s) and a time when the plurality of different animated images including the particular animated image(s) was presented by the dynamic keyboard interface, a time when the particular animated image(s) selected were initially made available for selection from amongst such plurality of different animated images by the dynamic keyboard interface, and/or the like. In some of such embodiments, for at least one animated image of the animated image(s) included in the plurality of different animated images associated with the current context(s), determining the position within the dynamic keyboard interface for presenting such animated image can include determining such position based at least in part on the data indicating the amount of time.

In some embodiments, determining such position based at least in part on the data indicating the amount of time can include normalizing the data indicating the amount of time based at least in part on a position of such animated image within the dynamic keyboard interface when the plurality of different animated images including the particular animated image(s) was presented by the dynamic keyboard interface, a position of such animated image within the dynamic keyboard interface when such animated image was initially made available for selection from amongst the plurality of different animated images including the particular animated image(s) by the dynamic keyboard interface, and/or the like.

Figure 3L:
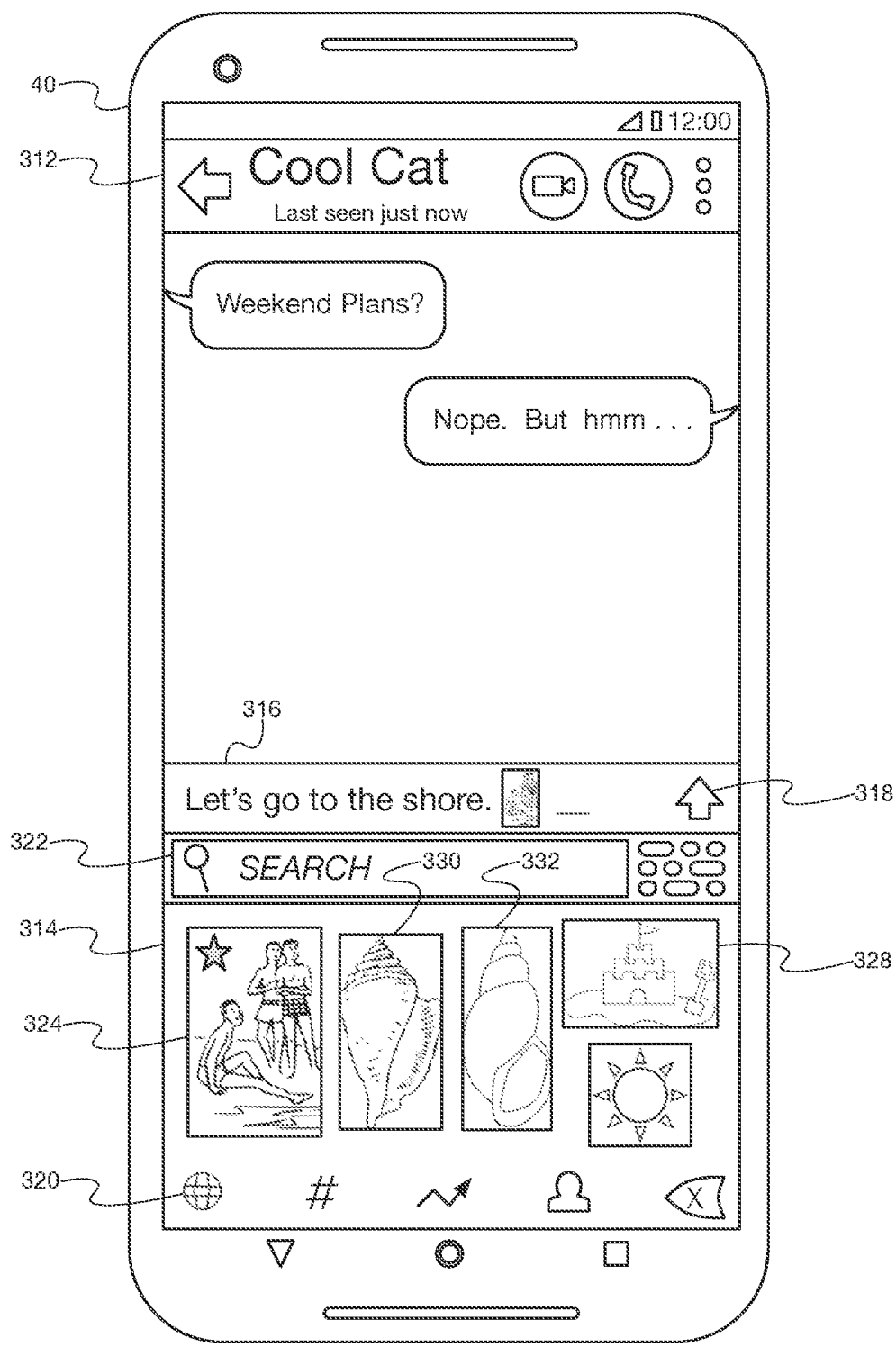
Figure 3M:
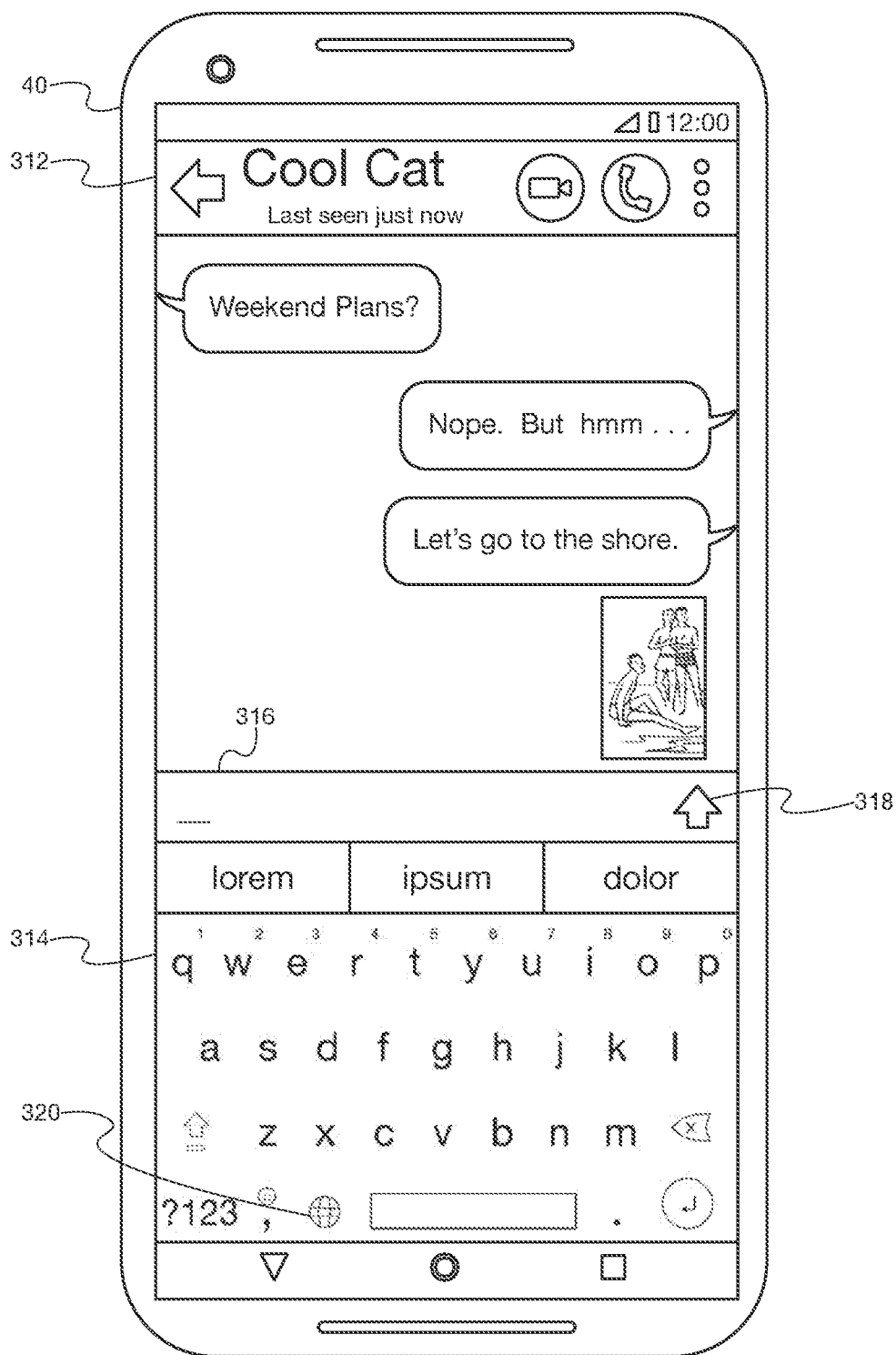

At (244), a user can select one or more particular animated images from amongst the plurality of different animated images associated with the current context(s) via the dynamic keyboard interface. For example, referring to FIG. 3L, the user can select animated image 324 for communication by the dynamic keyboard interface to the application associated with portion 312, and/or the like, and, referring to FIG. 3M, responsive to the user invoking element 318, and/or the like, the dynamic keyboard interface can communicate animated image 324 to the application associated with portion 312, and/or the like.

At (246), computing device 40 can generate data indicating the selection(s), selection type(s) (e.g., for communication to the application associated with portion 312, and/or the like), particular animated image(s) selected (e.g., animated image 324, and/or the like) and can communicate such data to computing system 112, which can receive the data and, at (248), can update the record(s) regarding the corpus of animated images based at least in part thereon.

Figure 3N:
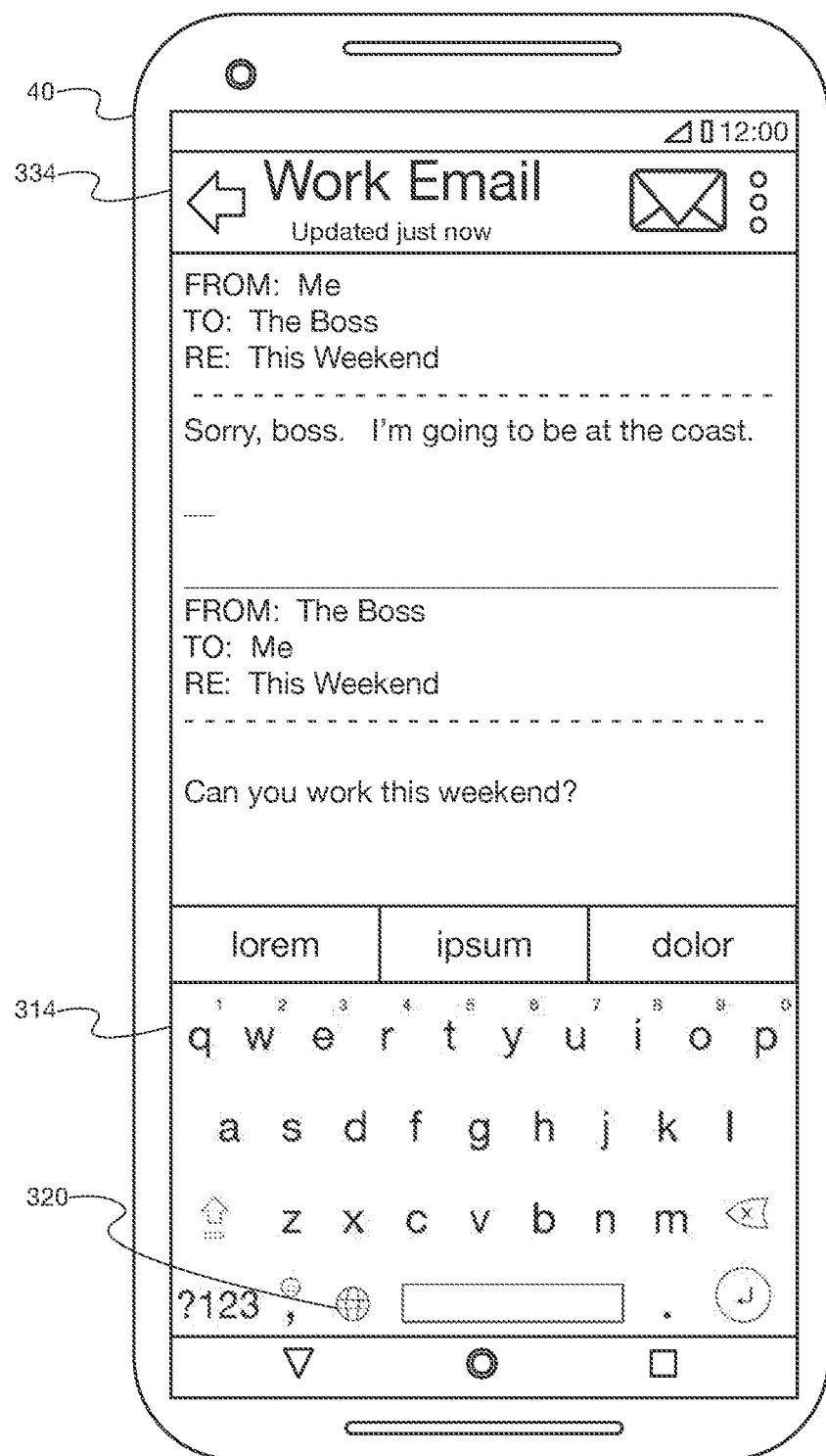
Figure 30:
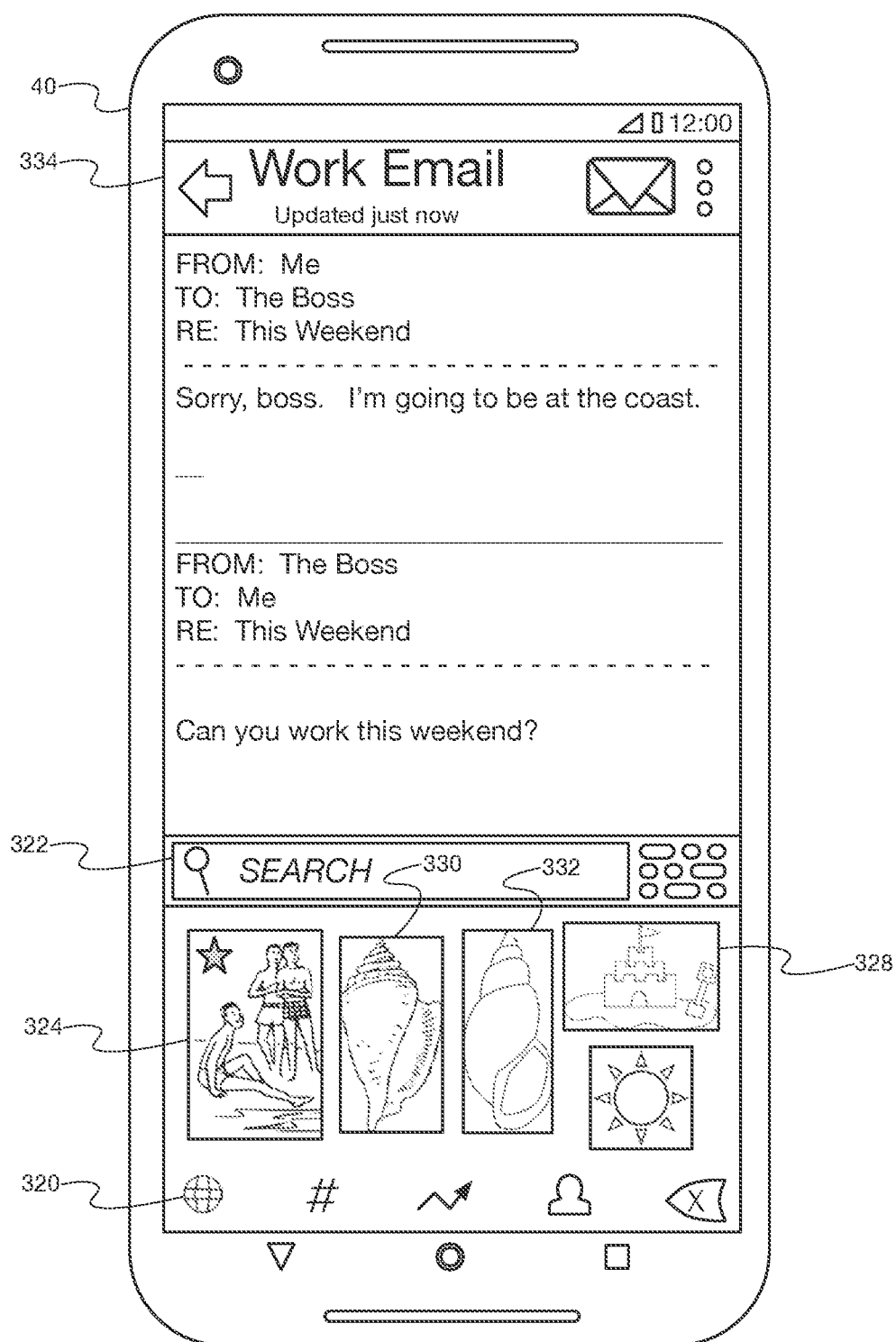

At (250), a user can perform one or more actions that provide one or more different and distinct current contexts associated with computing device 40. For example, referring to FIG. 3N, the user can switch from the application (e.g., the messaging application, and/or the like) associated with element 302 to the application (e.g., the email application, and/or the like) associated with element 304. Portion 334 can be associated with the application associated with element 304, and, as illustrated, the dynamic keyboard interface can be provided in association with such application. The context(s) provided can be of computing device 40, the dynamic keyboard interface, the application associated with portion 334, and/or the like.

At (252), computing device 40 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 334, and/or the like (e.g., "I'm going to be at the coast."; and/or the like).

Based at least in part on the data indicating the current context(s), the data indicating the previous context(s) (e.g., received at (210), (224), (238), and/or the like), the data indicating the previous selection(s), selection type(s), particular animated image(s) selected, and/or the like (e.g., received at (218), (232), (246), and/or the like), the record(s) regarding the corpus of animated images, and/or the like, at (254), computing system 112 can identify a plurality of different animated images associated with the current context(s) for presentation by the dynamic keyboard interface in association with the application associated with portion 334 (e.g., animated images relevant, responsive, and/or the like to the current context(s)). In some embodiments, one or more of the plurality of different animated images associated with the current context(s) can include one or more advertisements.

Based at least in part on the data indicating the current context(s), the data indicating the previous context(s) (e.g., received at (210), (224), (238), and/or the like), the data indicating the previous selection(s), selection type(s), particular animated image(s) selected, and/or the like (e.g., received at (218), (232), (246), and/or the like), the record(s) regarding the corpus of animated images, and/or the like, computing system 112 can determine, for each of one or more animated images included in the plurality of different animated images associated with the current context(s), a position within the dynamic keyboard interface for presenting the animated image.

At (256), computing system 112 can generate data indicating the plurality of different animated images associated with the current context(s), their respective determined positions, and/or the like and can communicate such data to computing device 40 (e.g., to the dynamic keyboard interface), which can receive the data.

Referring to FIG. 3O, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the current context(s) based at least in part on their respective determined positions. For example, the plurality of different animated images associated with the current context(s) can be presented in an ordered, sorted, and/or the like fashion (e.g., animated images determined to be more relevant, responsive, and/or the like to the current context(s) can be presented earlier, more prominently, and/or the like).

As illustrated, multiple different animated images from the plurality of different animated images associated with the current context(s) can be simultaneously displayed by the dynamic keyboard interface alongside one another. For example, the dynamic keyboard interface can simultaneously display animated images 324, 328, 330, and 332, amongst others of the plurality of different animated images associated with the current context(s), and/or the like.

In some embodiments, the animated image(s) included in the plurality of different animated images associated with the current context(s) can include one or more of the particular animated image(s) previously selected (e.g., animated images 324, 330, 332, and/or the like). In some of such embodiments, the position within the dynamic keyboard interface for presenting such particular animated image(s) can be determined based at least in part on their having been previously selected, the previous context(s) associated with their selection, and/or the like. For example, such particular animated image(s) can be presented earlier, more prominently, and/or the like than they otherwise would have been (e.g., absent their previous selection, and/or the like). In some embodiments, one or more of such particular animated image(s) can include one or more advertisements.

As previously indicated, in some embodiments, the data indicating the current context(s) can indicate data presented by and/or input into the dynamic keyboard interface, the application associated with portion 334, and/or the like (e.g., "I'm going to be at the coast"; and/or the like). In some of such embodiments, for one or more animated images of the animated image(s) included in the plurality of different animated images associated with the current context(s) (e.g., animated images 324, 330, 332, and/or the like), determining the position(s) within the dynamic keyboard interface for presenting such animated image(s) can include determining the data presented by and/or input into the dynamic keyboard interface, one or more applications associated with one or more of the previous context(s), and/or the like indicated by the data indicating one or more of the previous context(s) (e.g., "We're at the coast"; "Nice! Enjoy the beach."; "Let's go to the shore."; and/or the like) corresponds at least in part to the data presented by and/or input into the dynamic keyboard interface, the application associated with portion 334, and/or the like indicated by the data indicating the current context(s) (e.g., "I'm going to be at the coast"; and/or the like).

Figure 3P:
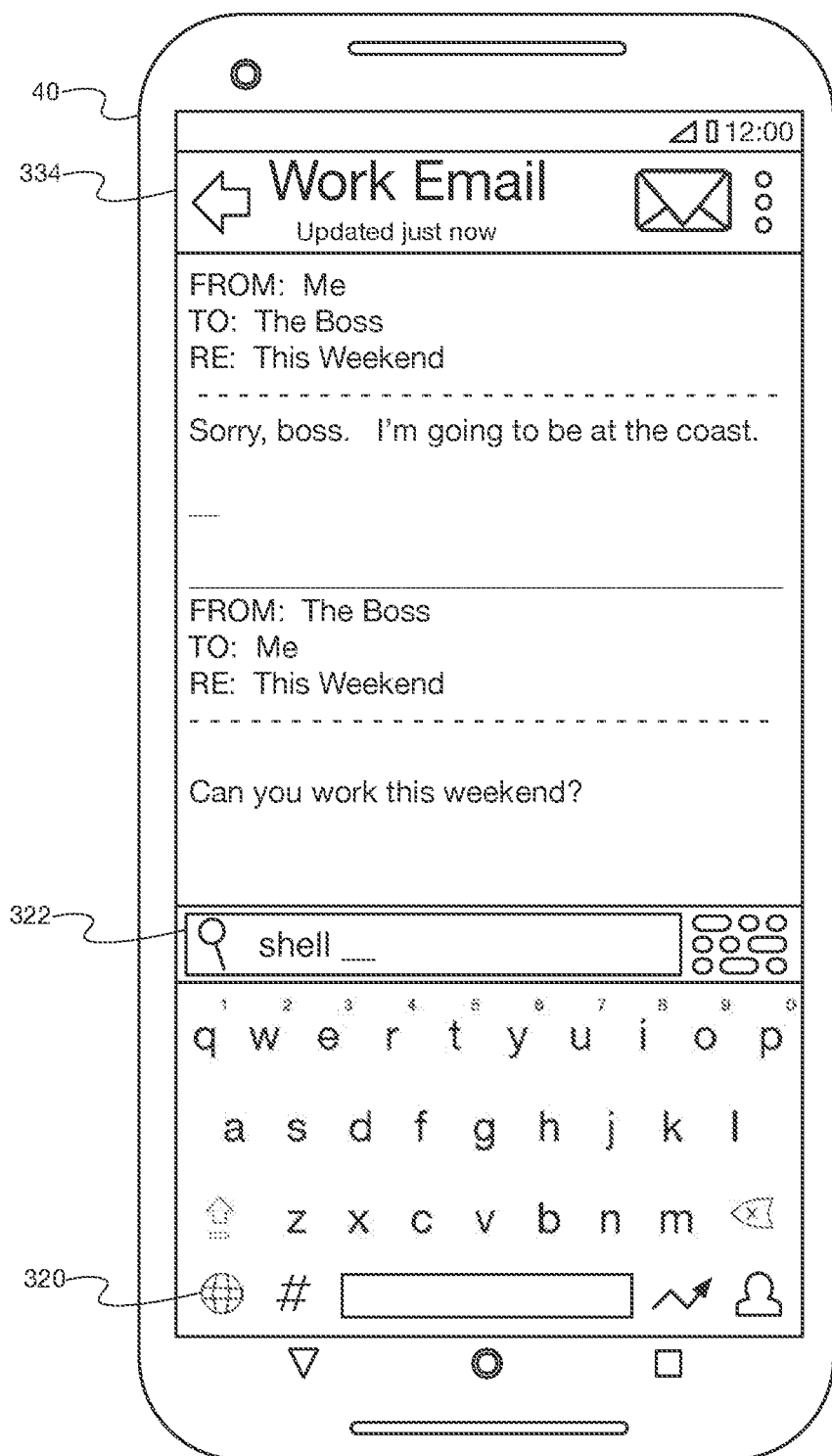

At (258), a user can perform one or more actions that provide one or more different and distinct current contexts associated with computing device 40. The context(s) provided can be of computing device 40, the dynamic keyboard interface, the application associated with portion 334, and/or the like. For example, referring to FIG. 3P, the user can invoke element 322 and utilize the illustrated keyboard to input one or more search terms (e.g., "shell," and/or the like).

At (260), computing device 40 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate the inputted search term(s), and/or the like.

Figure 2D:
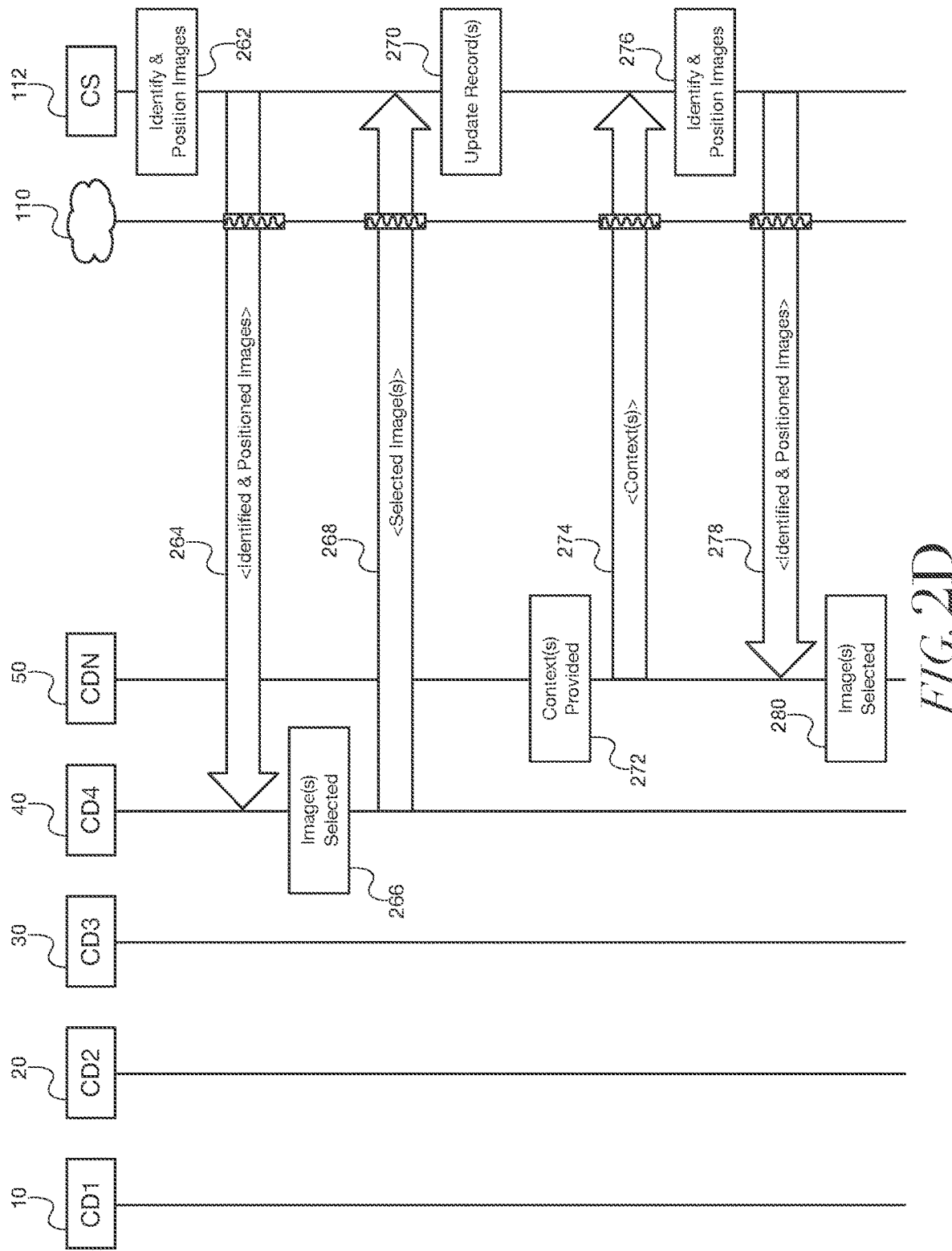

Referring to FIG. 2D, based at least in part on the data indicating the current context(s), the data indicating the previous context(s) (e.g., received at (210), (224), (238), (252), and/or the like), the data indicating the previous selection(s), selection type(s), particular animated image(s) selected, and/or the like (e.g., received at (218), (232), (246), and/or the like), the record(s) regarding the corpus of animated images, and/or the like, at (262), computing system 112 can identify a plurality of different animated images associated with the current context(s) for presentation by the dynamic keyboard interface in association with the application associated with portion 334 (e.g., animated images relevant, responsive, and/or the like to the current context(s)). In some embodiments, one or more of the plurality of different animated images associated with the current context(s) can include one or more advertisements.

Based at least in part on the data indicating the current context(s), the data indicating the previous context(s) (e.g., received at (210), (224), (238), (252), and/or the like), the data indicating the previous selection(s), selection type(s), particular animated image(s) selected, and/or the like (e.g., received at (218), (232), (246), and/or the like), the record(s) regarding the corpus of animated images, and/or the like, computing system 112 can determine, for each of one or more animated images included in the plurality of different animated images associated with the current context(s), a position within the dynamic keyboard interface for presenting the animated image.

Figure 3Q:
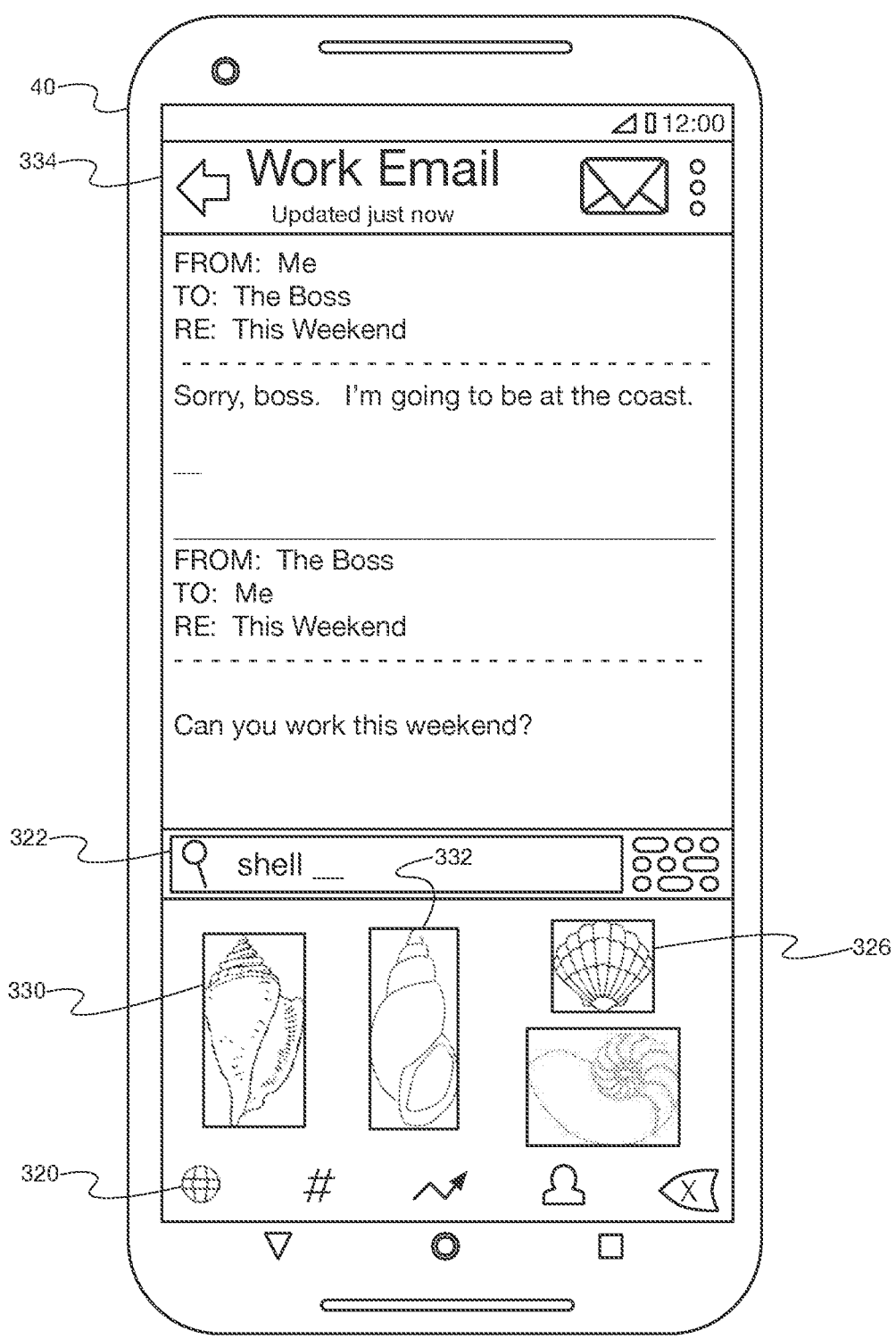

At (264), computing system 112 can generate data indicating the plurality of different animated images associated with the current context(s), their respective determined positions, and/or the like and can communicate such data to computing device 40 (e.g., to the dynamic keyboard interface), which can receive the data and, referring to FIG. 3Q, can toggle (e.g., from the qwerty keyboard, and/or the like) to the illustrated animated-image keyboard, and/or the like, which can present the plurality of different animated images associated with the current context(s) based at least in part on their respective determined positions. For example, the plurality of different animated images associated with the current context(s) can be presented in an ordered, sorted, and/or the like fashion (e.g., animated images determined to be more relevant, responsive, and/or the like to the current context(s) can be presented earlier, more prominently, and/or the like).

As illustrated, multiple different animated images from the plurality of different animated images associated with the current context(s) can be simultaneously displayed by the dynamic keyboard interface alongside one another. For example, the dynamic keyboard interface can simultaneously display animated images 326, 330, and 332, amongst others of the plurality of different animated images associated with the current context(s), and/or the like.

In some embodiments, the animated image(s) included in the plurality of different animated images associated with the current context(s) can include one or more of the particular animated image(s) previously selected (e.g., animated images 330, 332, and/or the like). In some of such embodiments, the position within the dynamic keyboard interface for presenting such particular animated image(s) can be determined based at least in part on their having been previously selected, the previous context(s) associated with their selection, and/or the like. For example, such particular animated image(s) can be presented earlier, more prominently, and/or the like than they otherwise would have been (e.g., absent their previous selection, and/or the like). In some embodiments, one or more of such particular animated image(s) can include one or more advertisements.

In some embodiments, for at least one animated image of the animated image(s) included in the plurality of different animated images associated with the current context(s), determining the position within the dynamic keyboard interface for presenting such animated image can include determining, based at least in part on previously received data indicating the selection of such animated image, a selection frequency for such animated image. In some of such embodiments, the position for such animated image can be determined based at least in part on the selection frequency for such animated image, one or more selection frequencies for such position, and/or the like.

In some embodiments, computing system 112 can determine the one or more selection frequencies for such position based at least in part on data indicating one or more selection frequencies for one or more animated images previously presented in such position within the dynamic keyboard interface. In some embodiments, the animated image(s) previously presented in such position can include one or more animated images that do not include advertisement content. Additionally or alternatively, the animated image(s) previously presented in such position can include one or more animated images comprising one or more advertisements different from an advertisement included in the animated image for which the position is being determined. In some embodiments, computing system 112 can determine the one or more selection frequencies for such position based at least in part on data indicating one or more previous contexts for which the animated image(s) were previously presented in such position.

Figure 3R:
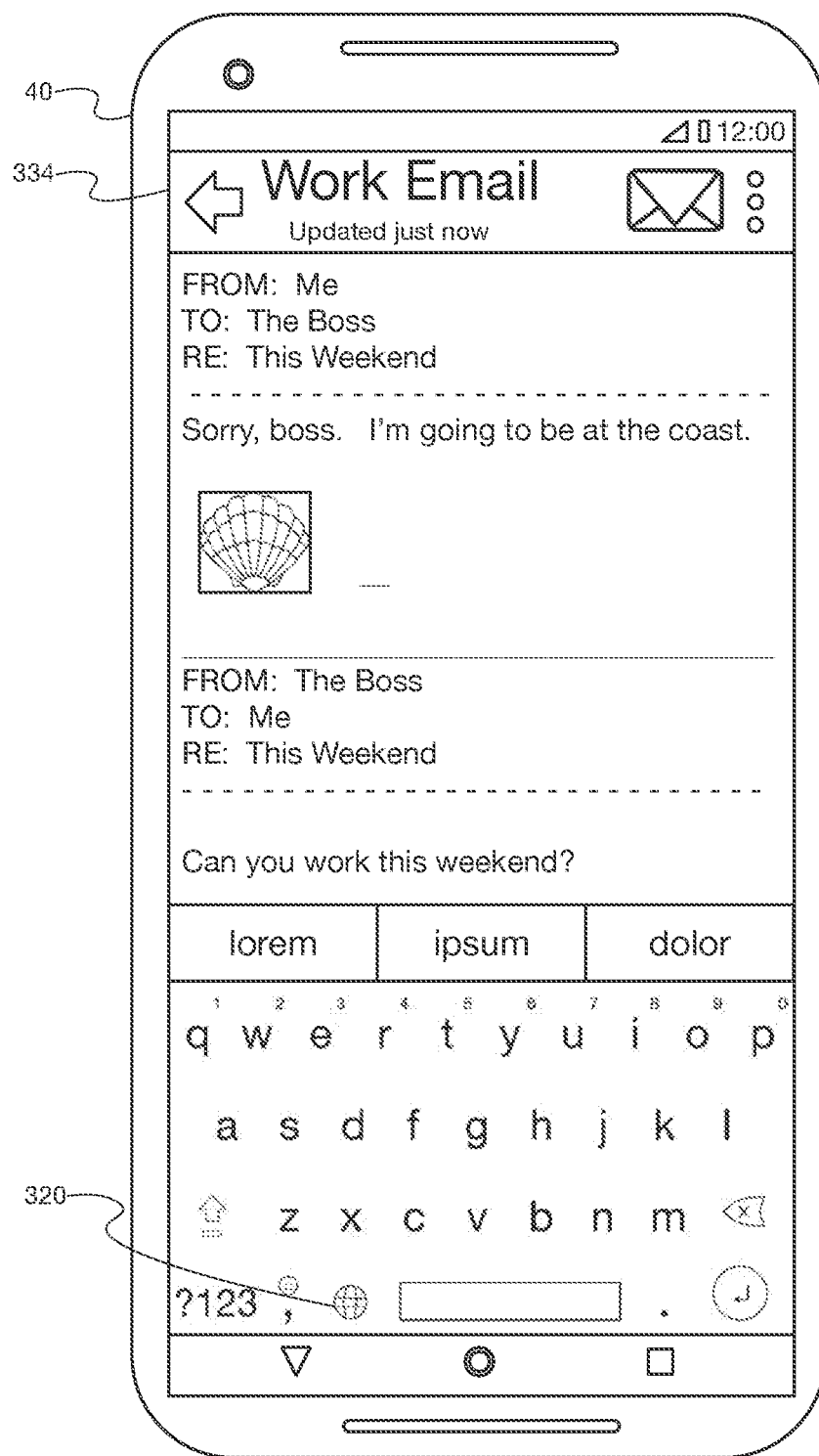

At (266), a user can select one or more particular animated images from amongst the plurality of different animated images associated with the current context(s) via the dynamic keyboard interface. For example, the user can select animated image 326 for communication by the dynamic keyboard interface to the application associated with portion 334, and/or the like, and, referring to FIG. 3R, the dynamic keyboard interface can communicate animated image 326 to the application associated with portion 334, and/or the like.

At (268), computing device 40 can generate data indicating the selection(s), selection type(s) (e.g., for communication to the application associated with portion 334, and/or the like), particular animated image(s) selected (e.g., animated image 326, and/or the like) and can communicate such data to computing system 112, which can receive the data and, at (270), can update the record(s) regarding the corpus of animated images based at least in part thereon.

Figure 3S:
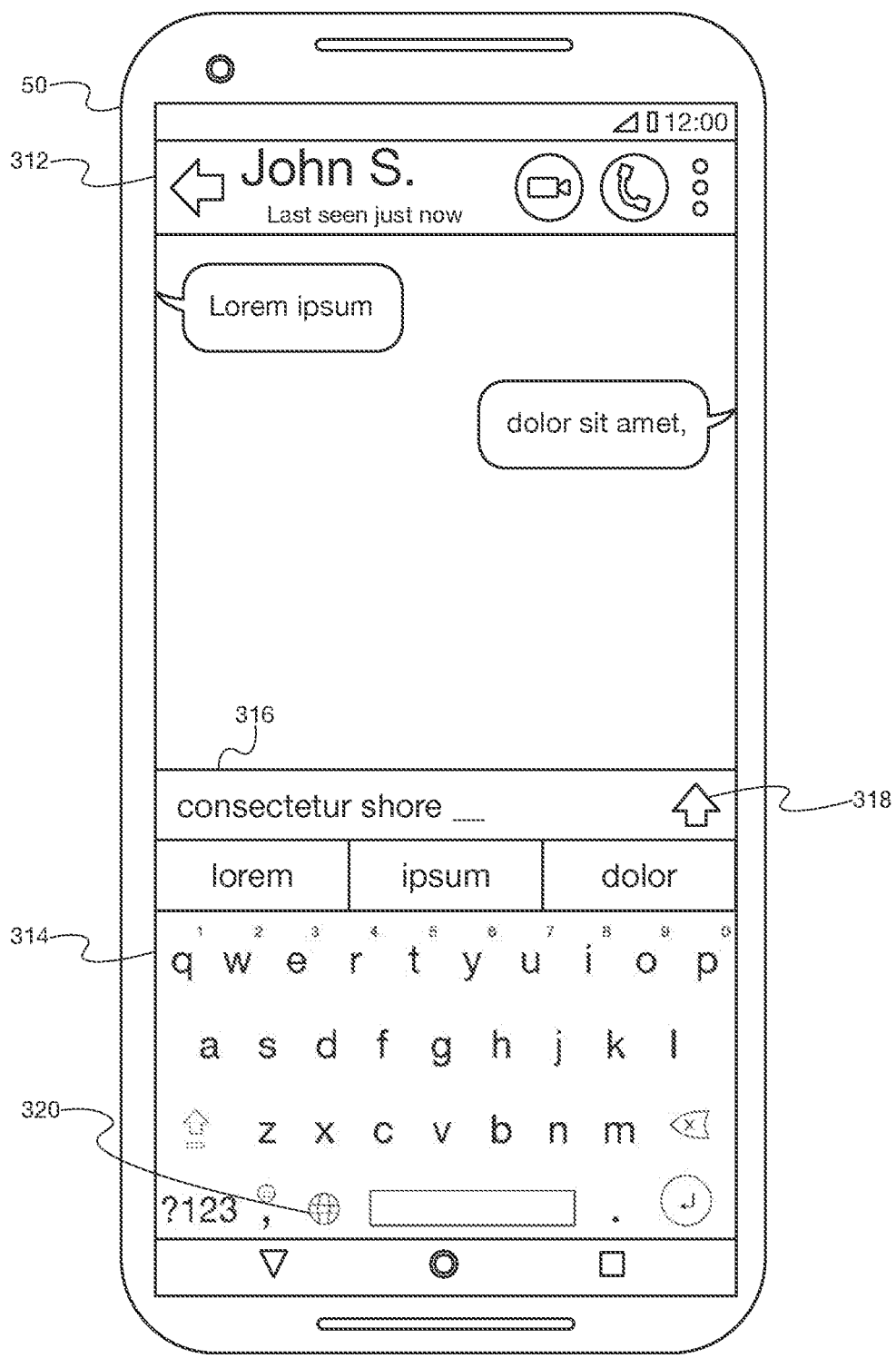

At (272), a user can perform one or more actions that provide one or more different and distinct current contexts associated with computing device 50. The context(s) provided can be of computing device 50, the dynamic keyboard interface, the application associated with portion 312, and/or the like. For example, referring to FIG. 3S, the user can interact with the application associated with portion 312 via its interface (e.g., switch to a message conversation with "John S.," and/or the like).

At (274), computing device 50 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 312, and/or the like (e.g., "consectetur shore," and/or the like).

Based at least in part on the data indicating the current context(s), the data indicating the previous context(s) (e.g., received at (210), (224), (238), (252), (260), and/or the like), the data indicating the previous selection(s), selection type(s), particular animated image(s) selected, and/or the like (e.g., received at (218), (232), (246), (268), and/or the like), the record(s) regarding the corpus of animated images, and/or the like, at (276), computing system 112 can identify a plurality of different animated images associated with the current context(s) for presentation by the dynamic keyboard interface in association with the application associated with portion 312 (e.g., animated images relevant, responsive, and/or the like to the current context(s)). In some embodiments, one or more of the plurality of different animated images associated with the current context(s) can include one or more advertisements.

Based at least in part on the data indicating the current context(s), the data indicating the previous context(s) (e.g., received at (210), (224), (238), (252), (260), and/or the like), the data indicating the previous selection(s), selection type(s), particular animated image(s) selected, and/or the like (e.g., received at (218), (232), (246), (268), and/or the like), the record(s) regarding the corpus of animated images, and/or the like, computing system 112 can determine, for each of one or more animated images included in the plurality of different animated images associated with the current context(s), a position within the dynamic keyboard interface for presenting the animated image.

At (278), computing system 112 can generate data indicating the plurality of different animated images associated with the current context(s), their respective determined positions, and/or the like and can communicate such data to computing device 50 (e.g., to the dynamic keyboard interface), which can receive the data.

Figure 3T:
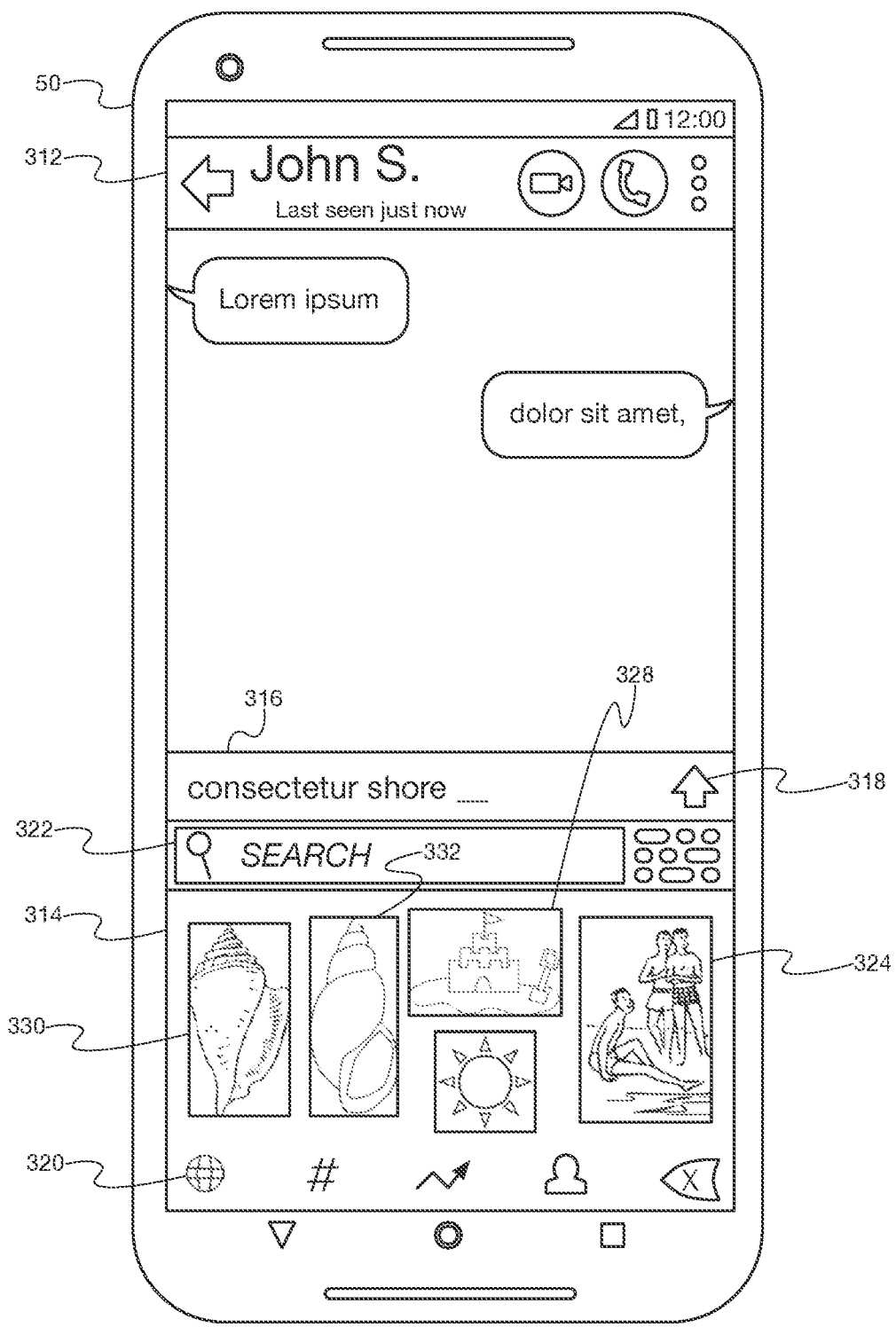

Referring to FIG. 3T, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the current context(s) based at least in part on their respective determined positions. For example, the plurality of different animated images associated with the current context(s) can be presented in an ordered, sorted, and/or the like fashion (e.g., animated images determined to be more relevant, responsive, and/or the like to the current context(s) can be presented earlier, more prominently, and/or the like).

As illustrated, multiple different animated images from the plurality of different animated images associated with the current context(s) can be simultaneously displayed by the dynamic keyboard interface alongside one another. For example, the dynamic keyboard interface can simultaneously display animated images 324, 328, 330, and 332, amongst others of the plurality of different animated images associated with the current context(s), and/or the like.

In some embodiments, the animated image(s) included in the plurality of different animated images associated with the current context(s) can include one or more of the particular animated image(s) previously selected (e.g., animated images 324, 330, 332, and/or the like). In some of such embodiments, the position within the dynamic keyboard interface for presenting such particular animated image(s) can be determined based at least in part on their having been previously selected, the previous context(s) associated with their selection, and/or the like. For example, such particular animated image(s) can be presented earlier, more prominently, and/or the like than they otherwise would have been (e.g., absent their previous selection, and/or the like). In some embodiments, one or more of such particular animated image(s) can include one or more advertisements.

As previously indicated, in some embodiments, the data indicating the current context(s) can indicate data presented by and/or input into the dynamic keyboard interface, the application associated with portion 312, and/or the like (e.g., "consectetur shore," and/or the like). In some of such embodiments, for one or more animated images of the animated image(s) included in the plurality of different animated images associated with the current context(s) (e.g., animated images 324, 330, 332, and/or the like), determining the position(s) within the dynamic keyboard interface for presenting such animated image(s) can include determining the data presented by and/or input into the dynamic keyboard interface, one or more applications associated with one or more of the previous context(s), and/or the like indicated by the data indicating one or more of the previous context(s) (e.g., "We're at the coast."; "Nice! Enjoy the beach."; "Let's go to the shore."; "I'm going to be at the coast."; and/or the like) corresponds at least in part to the data presented by and/or input into the dynamic keyboard interface, the application associated with portion 312, and/or the like indicated by the data indicating the current context(s) (e.g., "consectetur shore," and/or the like).

Figure 3U:
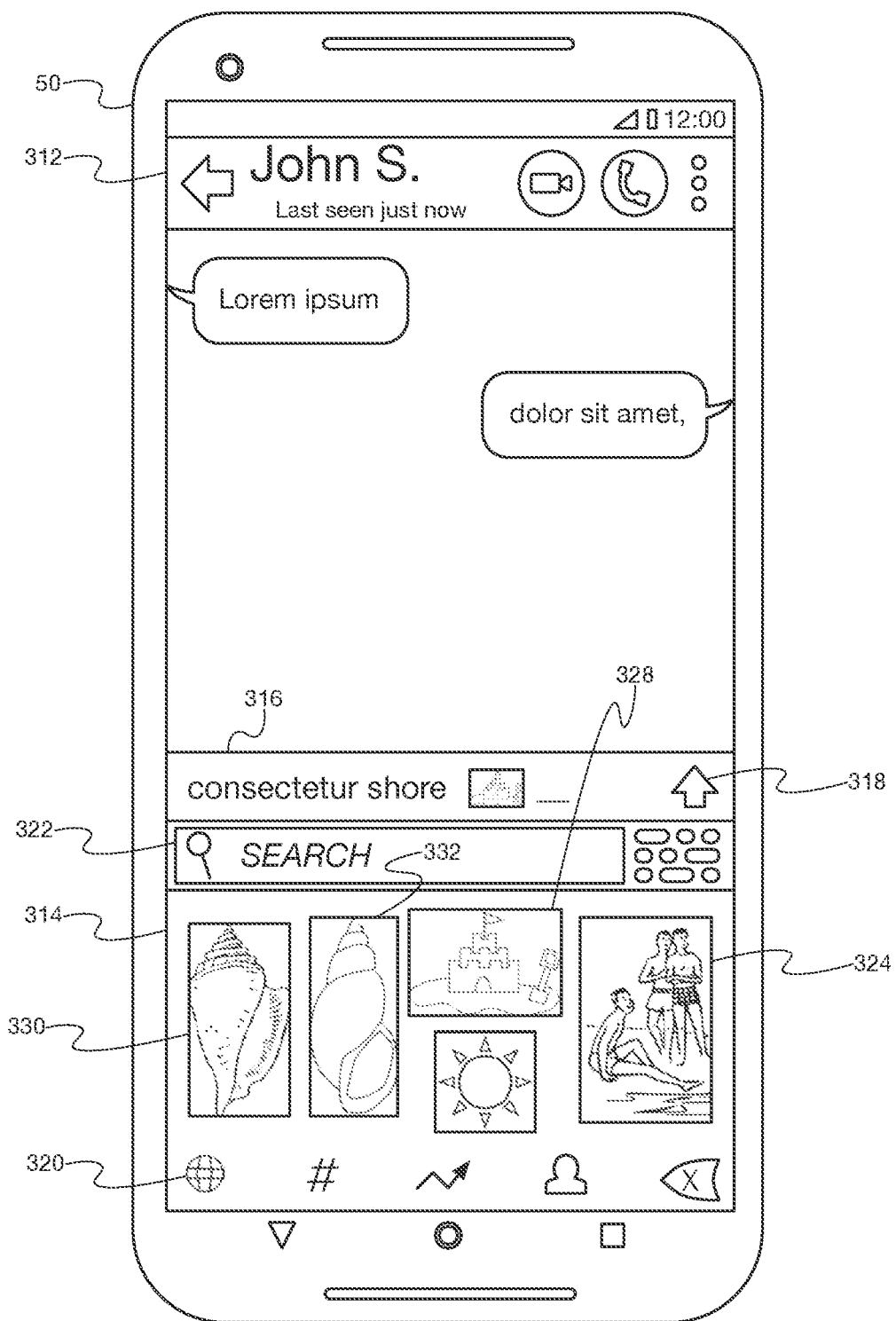
Figure 3V:
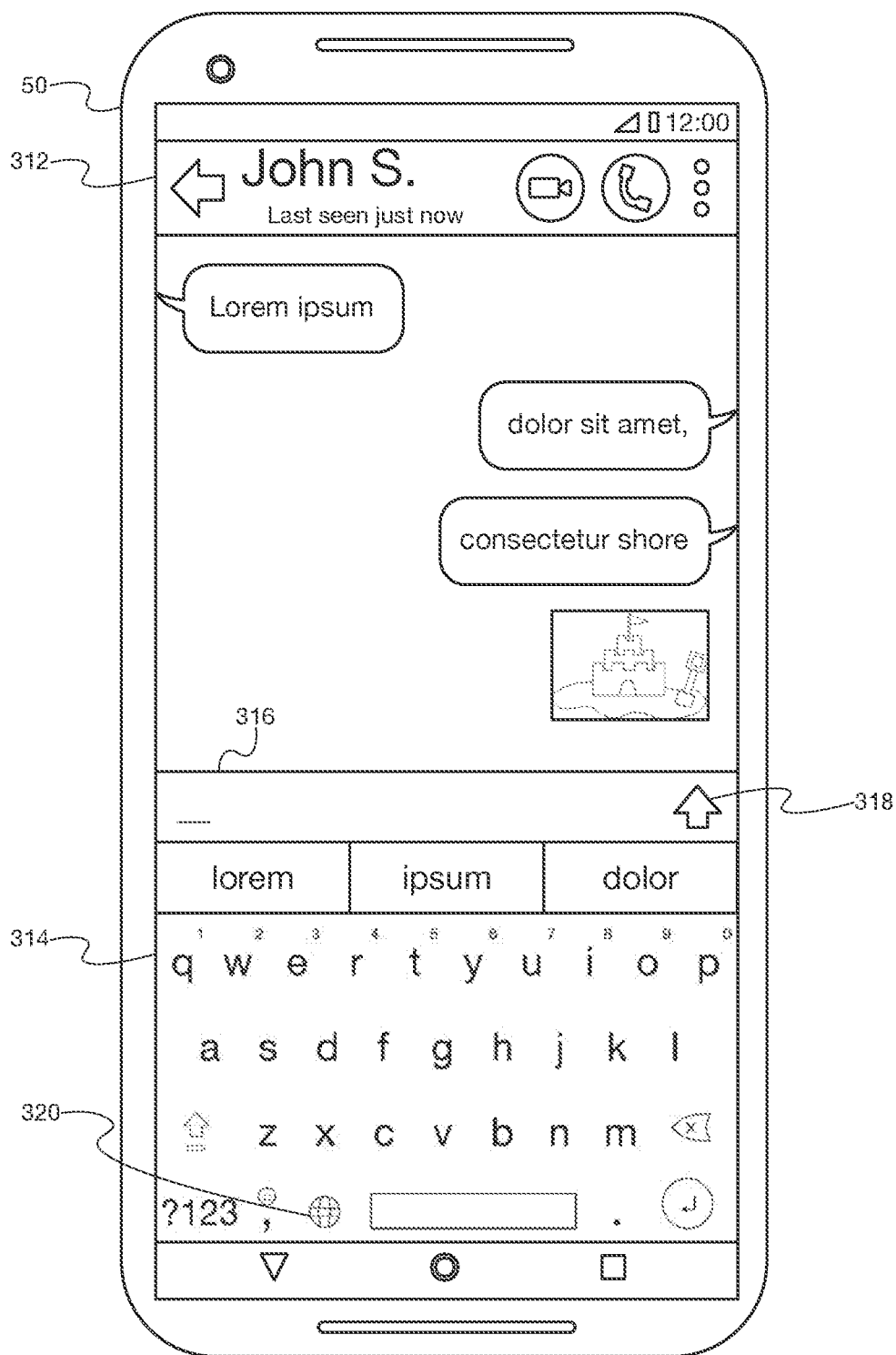

At (280), a user can select one or more particular animated images from amongst the plurality of different animated images associated with the current context(s) via the dynamic keyboard interface. For example, referring to FIG. 3U, the user can select animated image 328 for communication by the dynamic keyboard interface to the application associated with portion 312, and/or the like, and, referring to FIG. 3V, responsive to the user invoking element 318, and/or the like, the dynamic keyboard interface can communicate animated image 328 to the application associated with portion 312, and/or the like.

Figure 2E:
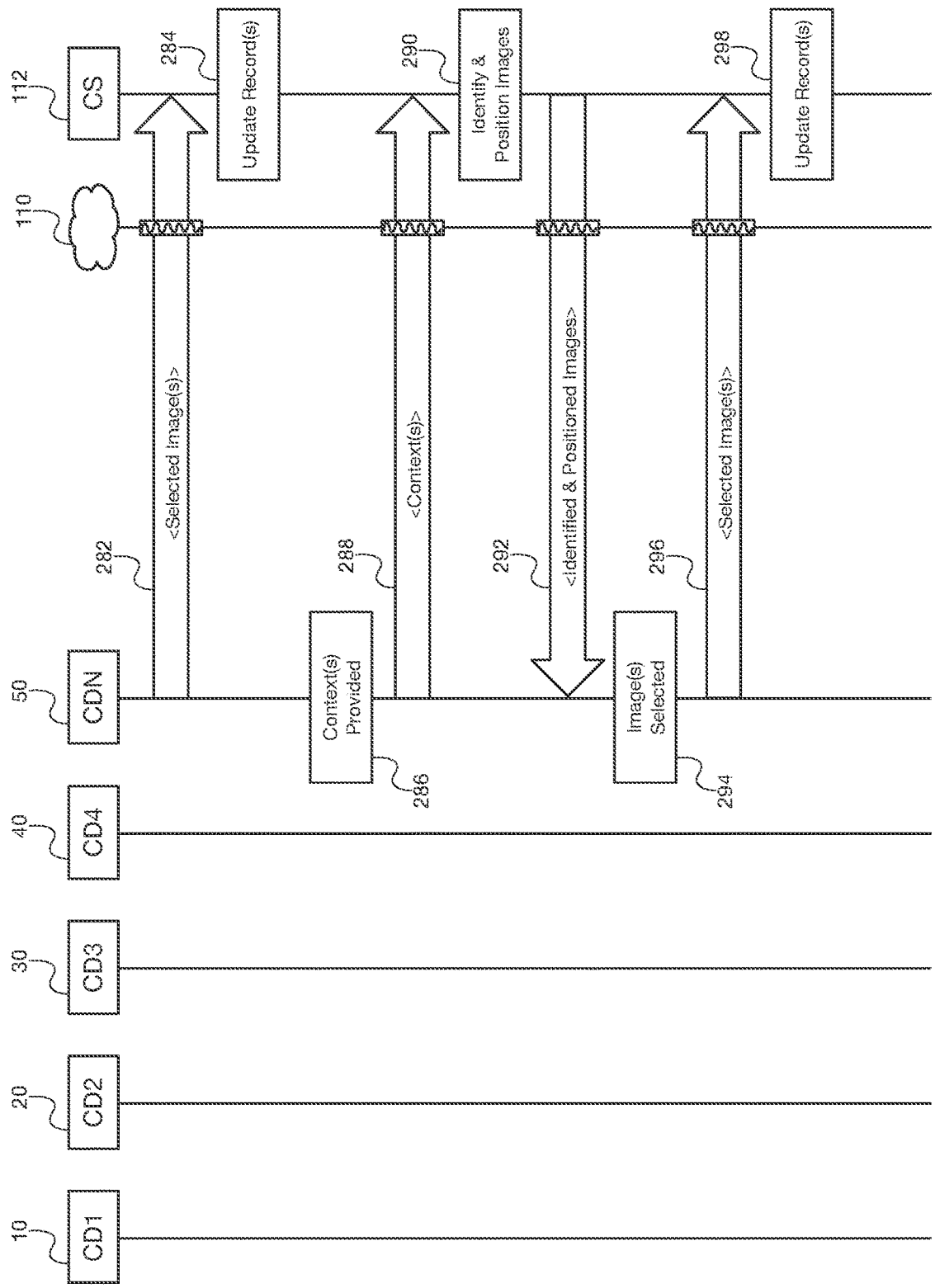

Referring to FIG. 2E, at (282), computing device 50 can generate data indicating the selection(s), selection type(s) (e.g., for communication to the application associated with portion 312, and/or the like), particular animated image(s) selected (e.g., animated image 328, and/or the like) and can communicate such data to computing system 112, which can receive the data and, at (284), can update the record(s) regarding the corpus of animated images based at least in part thereon.

Figure 3W:
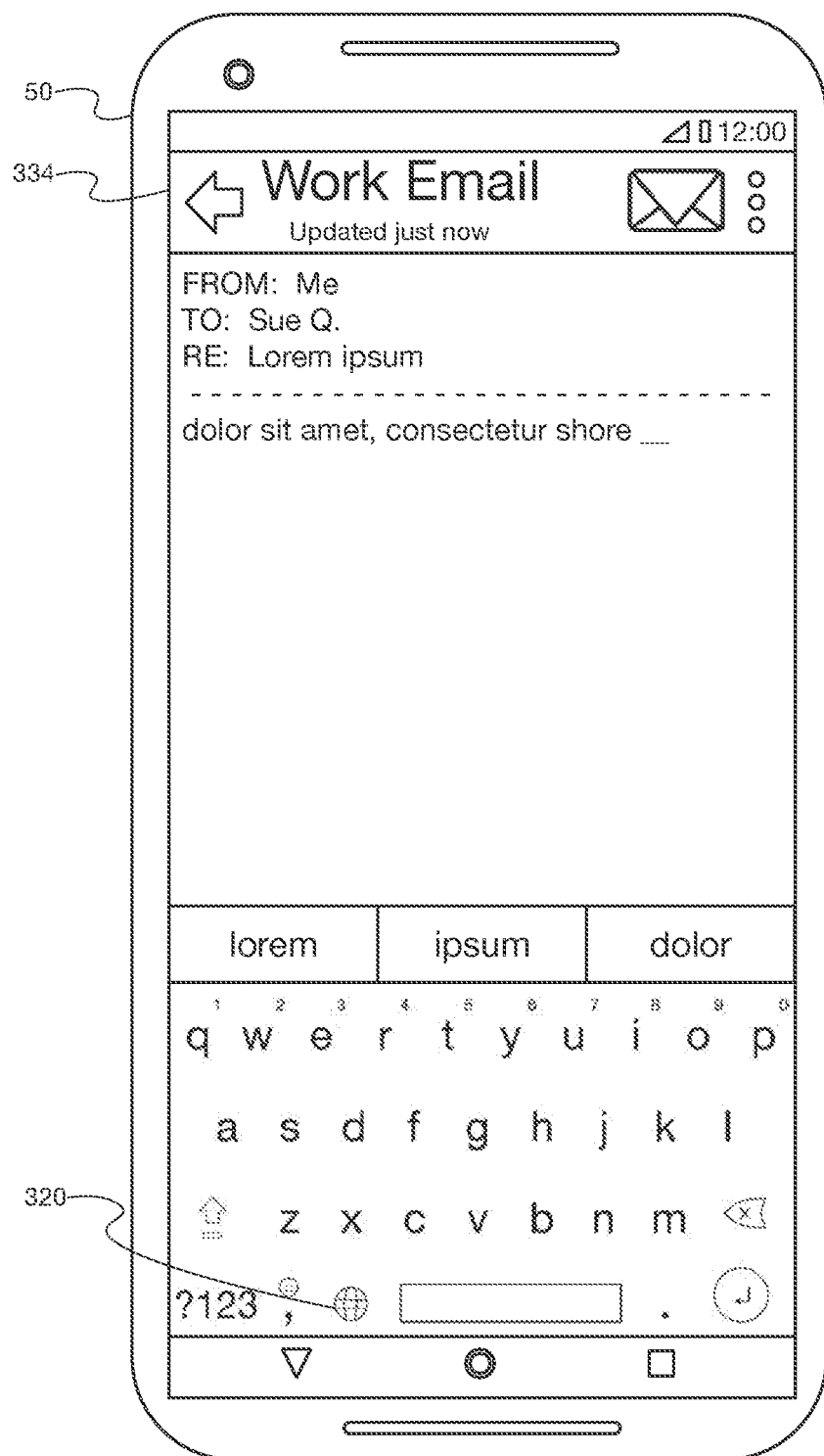

At (286), a user can perform one or more actions that provide one or more different and distinct current contexts associated with computing device 50. For example, referring to FIG. 3W, the user can switch from the application (e.g., the messaging application, and/or the like) associated with element 302 to the application (e.g., the email application, and/or the like) associated with element 304. The context(s) provided can be of computing device 50, the dynamic keyboard interface, the application associated with portion 334, and/or the like.

At (288), computing device 50 (e.g., the dynamic keyboard interface, and/or the like) can generate data indicating such context(s) and can communicate such data to computing system 112, which can receive the data and update the record(s) regarding the corpus of animated images based at least in part thereon. In some embodiments, the data indicating the context(s) can indicate data presented by and/or input into the dynamic keyboard interface, the application associated with portion 334, and/or the like (e.g., "consectetur shore," and/or the like).

Based at least in part on the data indicating the current context(s), the data indicating the previous context(s) (e.g., received at (210), (224), (238), (252), (260), (274), and/or the like), the data indicating the previous selection(s), selection type(s), particular animated image(s) selected, and/or the like (e.g., received at (218), (232), (246), (268), (282), and/or the like), the record(s) regarding the corpus of animated images, and/or the like, at (290), computing system 112 can identify a plurality of different animated images associated with the current context(s) for presentation by the dynamic keyboard interface in association with the application associated with portion 334 (e.g., animated images relevant, responsive, and/or the like to the current context(s)). In some embodiments, one or more of the plurality of different animated images associated with the current context(s) can include one or more advertisements.

Based at least in part on the data indicating the current context(s), the data indicating the previous context(s) (e.g., received at (210), (224), (238), (252), (260), (274), and/or the like), the data indicating the previous selection(s), selection type(s), particular animated image(s) selected, and/or the like (e.g., received at (218), (232), (246), (268), (282), and/or the like), the record(s) regarding the corpus of animated images, and/or the like, computing system 112 can determine, for each of one or more animated images included in the plurality of different animated images associated with the current context(s), a position within the dynamic keyboard interface for presenting the animated image.

At (292), computing system 112 can generate data indicating the plurality of different animated images associated with the current context(s), their respective determined positions, and/or the like and can communicate such data to computing device 50 (e.g., to the dynamic keyboard interface), which can receive the data.

Figure 3X:
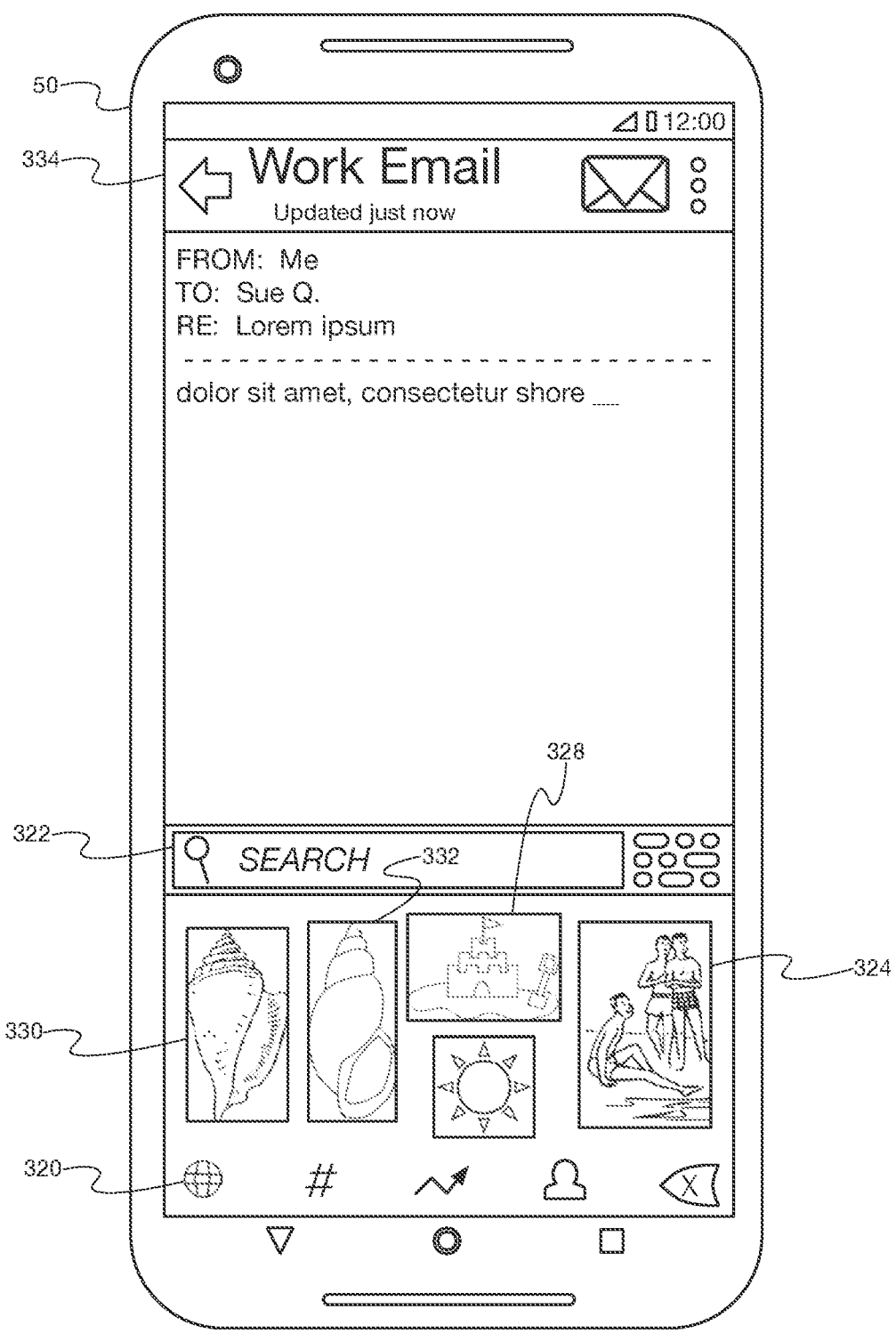

Referring to FIG. 3X, responsive to the user invoking element 320, and/or the like, the dynamic keyboard interface can toggle (e.g., from the qwerty keyboard, and/or the like) to the illustrated animated-image keyboard, and/or the like, which can present the plurality of different animated images associated with the current context(s) based at least in part on their respective determined positions. For example, the plurality of different animated images associated with the current context(s) can be presented in an ordered, sorted, and/or the like fashion (e.g., animated images determined to be more relevant, responsive, and/or the like to the current context(s) can be presented earlier, more prominently, and/or the like).

As illustrated, multiple different animated images from the plurality of different animated images associated with the current context(s) can be simultaneously displayed by the dynamic keyboard interface alongside one another. For example, the dynamic keyboard interface can simultaneously display animated images 324, 328, 330, and 332, amongst others of the plurality of different animated images associated with the current context(s), and/or the like.

In some embodiments, the animated image(s) included in the plurality of different animated images associated with the current context(s) can include one or more of the particular animated image(s) previously selected (e.g., animated images 324, 328, 330, 332, and/or the like). In some of such embodiments, the position within the dynamic keyboard interface for presenting such particular animated image(s) can be determined based at least in part on their having been previously selected, the previous context(s) associated with their selection, and/or the like. For example, such particular animated image(s) can be presented earlier, more prominently, and/or the like than they otherwise would have been (e.g., absent their previous selection, and/or the like). In some embodiments, one or more of such particular animated image(s) can include one or more advertisements.

As previously indicated, in some embodiments, the data indicating the current context(s) can indicate data presented by and/or input into the dynamic keyboard interface, the application associated with portion 334, and/or the like (e.g., "consectetur shore," and/or the like). In some of such embodiments, for one or more animated images of the animated image(s) included in the plurality of different animated images associated with the current context(s) (e.g., animated images 324, 328, 330, 332, and/or the like), determining the position(s) within the dynamic keyboard interface for presenting such animated image(s) can include determining the data presented by and/or input into the dynamic keyboard interface, one or more applications associated with one or more of the previous context(s), and/or the like indicated by the data indicating one or more of the previous context(s) (e.g., "We're at the coast"; "Nice! Enjoy the beach."; "Let's go to the shore."; "I'm going to be at the coast"; "consectetur shore"; and/or the like) corresponds at least in part to the data presented by and/or input into the dynamic keyboard interface, the application associated with portion 334, and/or the like indicated by the data indicating the current context(s) (e.g., "consectetur shore," and/or the like).

Figure 3Y:
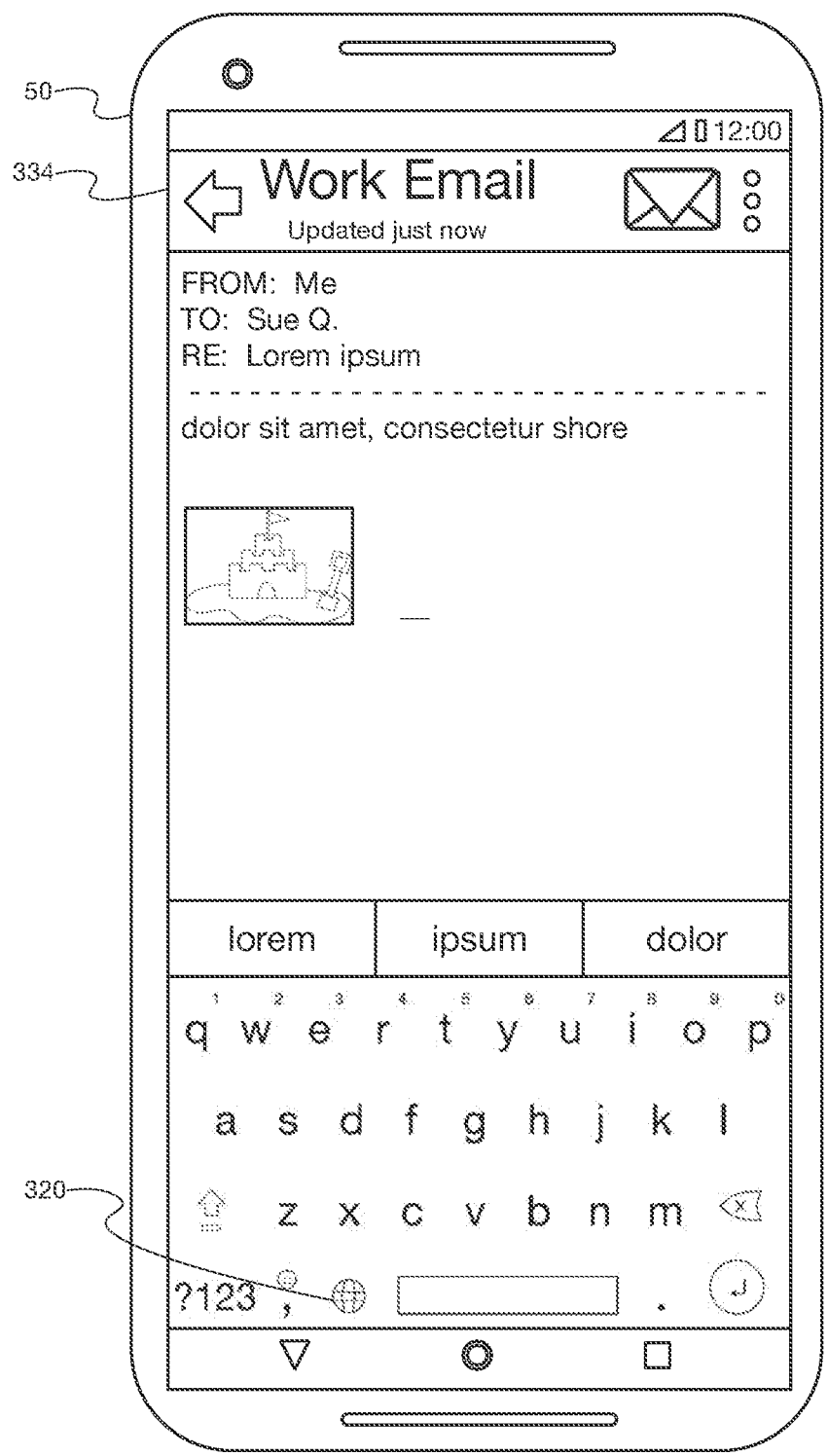

At (294), a user can select one or more particular animated images from amongst the plurality of different animated images associated with the current context(s) via the dynamic keyboard interface. For example, the user can select animated image 328 for communication by the dynamic keyboard interface to the application associated with portion 334, and/or the like, and, referring to FIG. 3Y, the dynamic keyboard interface can communicate animated image 328 to the application associated with portion 334, and/or the like.

At (296), computing device 50 can generate data indicating the selection(s), selection type(s) (e.g., for communication to the application associated with portion 334, and/or the like), particular animated image(s) selected (e.g., animated image 328, and/or the like) and can communicate such data to computing system 112, which can receive the data and, at (298), can update the record(s) regarding the corpus of animated images based at least in part thereon.

Figure 4:
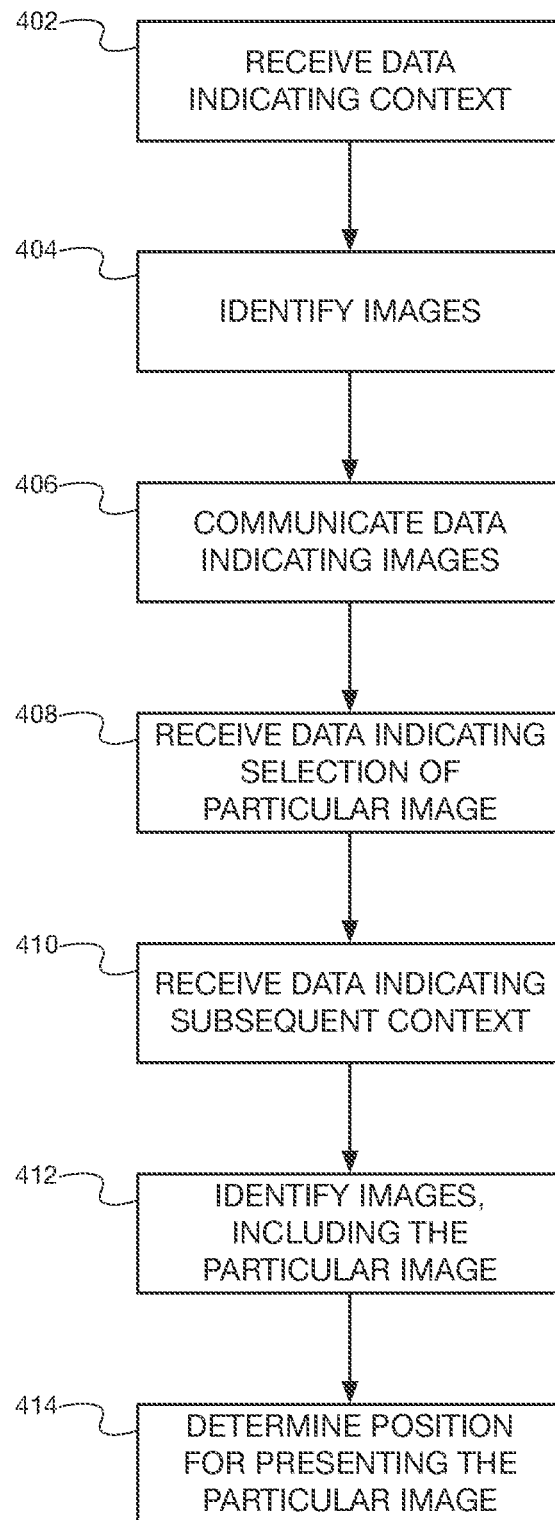
FIG. 4 depicts an example method according to example embodiments of the present disclosure.

FIG. 4 depicts an example method according to example embodiments of the present disclosure.

Referring to FIG. 4, at (402), one or more computing devices can receive data indicating a context of: a dynamic keyboard interface provided in association with an application, and/or the application. For example, computing system 112 can receive, from computing device 40, data indicating a context of: the dynamic keyboard interface provided in association with the application associated with portion 312 (e.g., the messaging application, and/or the like), and/or the application associated with portion 312.

At (404), the computing device(s) can identify, based at least in part on the data indicating the context, a plurality of different animated images for presentation by the dynamic keyboard interface in association with the application. For example, computing system 112 can identify, based at least in part on the data received from computing device 40, the plurality of different animated images included in the animated-image keyboard depicted by FIG. 3D (e.g., animated images 324, 326, 328, and/or the like) for presentation by the dynamic keyboard interface in association with the application associated with portion 312.

At (406), the computing device(s) can communicate, to a user device, data indicating the plurality of different animated images. For example, computing system 112 can communicate, to computing device 40, data indicating the plurality of different animated images included in the animated-image keyboard depicted by FIG. 3D (e.g., animated images 324, 326, 328, and/or the like).

At (408), the computing device(s) can receive, from the user device, data indicating selection of a particular animated image from amongst the plurality of different animated images. For example, computing system 112 can receive, from computing device 40, data indicating selection of animated image 324.

At (410), the computing device(s) can receive data indicating a subsequent context of: the dynamic keyboard interface, the application, and/or a different and distinct application in association with which the dynamic keyboard interface is provided. For example, computing system 112 can receive, from computing device 50, data indicating a context of: the application associated with portion 334 (e.g., the email application, and/or the like), and/or the dynamic keyboard interface provided in association therewith.

At (412), the computing device(s) can identify, based at least in part on the data indicating the subsequent context, a plurality of different animated images that includes the particular animated image. For example, computing system 112 can identify, based at least in part on the data received from computing device 50, the plurality of different animated images included in the animated-image keyboard depicted by FIG. 3X (e.g., animated images 324, 328, 330, 332, and/or the like) for presentation by the dynamic keyboard interface in association with the application associated with portion 334.

At (414), the computing device(s) can determine, based at least in part on the data indicating the selection and the data indicating the context, a position within the dynamic keyboard interface for presenting the particular animated image in response to data indicating the subsequent context. For example, computing system 112 can identify, based at least in part on the data indicating the selection of animated image 324, a position within the dynamic keyboard interface for presenting animated image 324 in response to data indicating the context of: the application associated with portion 334 (e.g., the email application, and/or the like), and/or the dynamic keyboard interface provided in association therewith.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or indicated steps are merely illustrative and can be omitted, combined, and/or performed in an order other than that depicted and/or indicated; the numbering of depicted steps is merely for ease of reference and does not imply any particular ordering is necessary or preferred.

The functions and/or steps indicated herein can be embodied in computer-usable data and/or computer-executable instructions, executed by one or more computers and/or other devices to perform one or more functions indicated herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data indicated herein.

Although not required, one of ordinary skill in the art will appreciate that various aspects indicated herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As indicated herein, the various methods and acts can be operative across one or more computing devices and/or networks. The functionality can be distributed in any manner or can be located in a single computing device (e.g., server, client computer, user device, or the like).

Aspects of the disclosure have been indicated in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or indicated can be performed in other than the recited order and/or that one or more illustrated steps can be optional and/or combined. Any and all features in the following claims can be combined and/or rearranged in any way possible.

While the present subject matter has been indicated in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or indicated as part of one embodiment can be used with another embodiment to yield a still further embodiment. Thus, it is intended that the present disclosure cover such alterations, variations, and/or equivalents.

What is claimed is:

1. A computer-implemented method, the method comprising:
    receiving, by one or more computing devices, data indicating a selection of a particular animated image by a user from amongst a plurality of different animated images presented by a dynamic keyboard interface provided in association with an application;
    receiving, by the one or more computing devices, data indicating a context associated with at least one of the dynamic keyboard interface or the application, wherein the data indicating the context comprises a previous animated image associated with a previous interaction, wherein the previous interaction comprises a reply with the particular animated image in response to receiving the previous animated image from another user;

determining, by the one or more computing devices, a frequency of sequential interactions between the particular animated image and the previous animated image, wherein the sequential interactions comprise the particular animated image being selected by the user as the reply in response to receiving the previous animated image from another user; and determining, by the one or more computing devices and based at least in part on the data indicating the selection, the frequency of sequential interactions, a position within the dynamic keyboard interface for presenting the particular animated image in response to data indicating a subsequent context that corresponds to the data indicating the context.

2. The method of claim 1, wherein the dynamic keyboard interface comprises one or more interface element to toggle between a plurality of different keyboards.

3. The method of claim 2, wherein the plurality of different keyboards comprise a plurality of different language keyboards associated with a plurality of different languages.

4. The method of claim 2, wherein the plurality of different keyboards comprise an animated image keyboard and one or more alphabet keyboards, wherein the one or more alphabet keyboards comprises a qwerty keyboard.

5. The method of claim 1, wherein determining the position within the dynamic keyboard interface for presenting the particular animated image comprises:

determining a selection frequency for the particular animated image when displayed; and determining the position based at least in part on the selection frequency and one or more selection frequencies for the position.

6. The method of claim 1, wherein the data indicating context further comprises data associated with a plurality of distinct computer applications.

7. The method of claim 1, further comprising:

receiving, by the one or more computing devices, a selection of a user invoking element of the dynamic keyboard interface, wherein the user invoking element is configured to be selected to toggle between various different keyboards of the dynamic keyboard interface.

8. The method of claim 1, further comprising:

providing, by the one or more computing devices, an alphabet keyboard for display in the dynamic keyboard interface;

receiving, by the one or more computing devices, a selection of a user invoking element of the dynamic keyboard interface; and providing, by the one or more computing devices, the particular animated image for display in an animated-image keyboard in the dynamic keyboard interface.

9. The method of claim 1, wherein the particular animated image comprises a graphics interchange format image.

10. The method of claim 1, wherein the particular animated image is provided for display with a plurality of other animated images, wherein specific positions of at least a portion of the plurality of other animated images are determined based on the frequency of sequential interactions.

11. The method of claim 10, wherein the plurality of other animated images comprise one or more advertisements.

12. A computing system, the computing system comprising:

one or more processors; and one or more non-transitory computer-readable media that collectively store instructions that, when executed by the one or more processors, cause the computing system to perform operations, the operations comprising:

receiving data indicating a selection of a particular animated image by a user from amongst a plurality of different animated images presented by a dynamic keyboard interface provided in association with an application;

receiving data indicating a context associated with at least one of the dynamic keyboard interface or the application, wherein the data indicating the context comprises a previous animated image associated with a previous interaction, wherein the previous interaction comprises a reply with the particular animated image in response to receiving the previous animated image from another user;

determining a frequency of sequential interactions between the particular animated image and the previous animated image, wherein the sequential interactions comprise the particular animated image being selected by the user as the reply in response to receiving the previous animated image from another user; and determining, based at least in part on the data indicating the selection, the frequency of sequential interactions, a position within the dynamic keyboard interface for presenting the particular animated image in response to data indicating a subsequent context that corresponds to the data indicating the context.

13. The system of claim 12, wherein the data indicating the context comprises data descriptive of a size of an audience of a message being composed.

14. The system of claim 12, wherein the data indicating context further comprises data indicating a selection of a media content item associated with an advertisement.

15. The system of claim 14, wherein data indicating the selection comprises receiving the data indicating the selection comprises receiving the data indicating the selection from a user device on which an application is executed;

receiving the data indicating a context comprises data indicating the context from the user device on which the application is executed; and the context comprises a context of the user device when the user device is providing the dynamic keyboard interface in association with the application.

16. The system of claim 12, wherein the data indicating the context further comprises a network identifier associated with a user device executing the dynamic keyboard interface.

17. The system of claim 12, wherein the data indicating the context further comprises a geographic location of a user device executing the dynamic keyboard interface.

18. The system of claim 12, wherein the data indicating the context further comprises a human-language setting associated with a user device executing the dynamic keyboard interface.

19. The system of claim 12, wherein:

the data indicating the context comprises one or more search terms input via the dynamic keyboard interface; and the data indicating the subsequent context comprises at least one of the one or more search terms input via the dynamic keyboard interface.

20. One or more non-transitory computer-readable media that collectively store instructions that, when executed by one or more computing devices, cause the one or more computing devices to perform operations, the operations comprising:

receiving data indicating a context associated with at least one of a dynamic keyboard interface or an application, wherein the data indicating the context comprises:

a previous animated image received from a first contact, wherein the previous animated image is associated with a previous interaction, wherein the previous interaction comprises a reply with a particular animated image by a user in response to receiving the previous animated image from another user; and a message exchange between a user and a second contact;

determining a frequency of sequential interactions between the particular animated image and the previous animated image, wherein the sequential interactions comprise the particular animated image being selected by the user as the reply in response to receiving the previous animated image from another user; and determining, based at least in part on the, the frequency of sequential interactions and contextual relevancy associated with the message exchange between the user and the second contact, a position within the dynamic keyboard interface for presenting the particular animated image in composing a message for the first contact;

receiving data indicating a selection of the particular animated image from amongst a plurality of different animated images presented by the dynamic keyboard interface provided in association with the application; and inputting the particular animated image into an input area of the dynamic keyboard interface.

\* \* \* \* \*